United States Patent
Aubert et al.

(10) Patent No.: US 11,710,827 B2
(45) Date of Patent: Jul. 25, 2023

(54) METHOD FOR THE PREPARATION OF AN ELECTRODE COMPRISING AN ALUMINIUM SUBSTRATE, ALIGNED CARBON NANOTUBES AND AN ELECTROCONDUCTIVE ORGANIC POLYMER, THE ELECTRODE AND USES THEREOF

(71) Applicants: NAWATECHNOLOGIES, Aix-en-Provence (FR); COMMISSARIAT À L'ÉNERGIE ATOMIQUE ET AUX ÉNERGIES ALTERNATIVES, Paris (FR); UNIVERSITÉ DE CERGY-PONTOISE, Cergy-Pontoise (FR); UNIVERSITÉ DE TOURS, Tours (FR)

(72) Inventors: Pierre-Henri Aubert, Osny (FR); Philippe Banet, Acheres (FR); Aurélien Boisset, Gardanne (FR); Léa Darchy, Greasque (FR); Jérémie Descarpentries, Gif sur Yvette (FR); Fouad Ghamouss, Joues-les-Tours (FR); Harald Hauf, La Seyne sur Mer (FR); Martine Mayne, Les Molieres (FR); Mathieu Pinault, Fresnes (FR); François Tran Van, Fondettes (FR); Thomas Vignal, Baillet-en-France (FR)

(73) Assignees: CY CERGY PARIS UNIVERSITÉ, Cergy-Pontoise (FR); UNIVERSITÉDE TOURS, Tours (FR); NAWATECHNOLOGIES, Aix-en-Provence (FR); COMMISSARIAT ÁL'ÉNERGIE ATOMIQUE ET AUX ÉNERGIES ALTERNATIVES, Paris (FR)

( * ) Notice: Subject to any disclaimer, the term of this patent is extended or adjusted under 35 U.S.C. 154(b) by 140 days.

(21) Appl. No.: 16/488,798

(22) PCT Filed: Feb. 28, 2018

(86) PCT No.: PCT/FR2018/050473
§ 371 (c)(1),
(2) Date: Aug. 26, 2019

(87) PCT Pub. No.: WO2018/158543
PCT Pub. Date: Sep. 7, 2018

(65) Prior Publication Data
US 2020/0067096 A1 Feb. 27, 2020

(30) Foreign Application Priority Data
Mar. 1, 2017 (FR) ..................................... 1751669

(51) Int. Cl.
*H01M 4/60* (2006.01)
*H01M 4/04* (2006.01)
(Continued)

(52) U.S. Cl.
CPC ......... *H01M 4/608* (2013.01); *H01M 4/0428* (2013.01); *H01M 4/0452* (2013.01);
(Continued)

(58) Field of Classification Search
CPC ............. H01M 4/0428; H01M 4/0452; H01M 4/0466; H01M 4/661; H01M 4/662;
(Continued)

(56) References Cited

U.S. PATENT DOCUMENTS

2003/0003359 A1* 1/2003 Banno ..................... H01M 6/22
429/189
2004/0206942 A1* 10/2004 Hsu ........................ H01B 1/127
252/500

(Continued)

FOREIGN PATENT DOCUMENTS

WO 2008016990 A2 2/2008
WO 2010117339 A1 10/2010
(Continued)

OTHER PUBLICATIONS

Su et al., "Effective growth of vertically aligned carbon nanotube turfs on flexible AI foil," 2011, Materials Letters, 65, 2700-2702. (Year: 2011).*
(Continued)

*Primary Examiner* — Matthew W Van Oudenaren
(74) *Attorney, Agent, or Firm* — Pearne & Gordon LLP

(57) ABSTRACT

A method for the preparation of an electrode comprising a substrate made of an aluminium based material, vertically
(Continued)

aligned carbon nanotubes and an electrically conductive polymer matrix, the method comprising the following successive steps: (a) synthesising, on a substrate made of an aluminium based material, a carpet of vertically aligned carbon nanotubes according to the technique of CVD (Chemical Vapour Deposition) at a temperature less than or equal to 650° C.; (b) electrochemically depositing the polymer matrix on the carbon nanotubes from an electrolyte solution including at least one precursor monomer of the matrix, at least one ionic liquid and at least one protic or aprotic solvent. Further disclosed is the prepared electrode and a device for storing and returning electricity such as a supercapacitor comprising the electrode.

20 Claims, 7 Drawing Sheets

(51) Int. Cl.
| | | |
|---|---|---|
| | *H01M 4/66* | (2006.01) |
| | *H01M 4/1393* | (2010.01) |
| | *H01G 11/86* | (2013.01) |
| | *H01G 11/36* | (2013.01) |
| | *H01M 4/137* | (2010.01) |
| | *H01M 4/1399* | (2010.01) |
| | *H01M 4/133* | (2010.01) |
| | *H01G 11/48* | (2013.01) |
| | *H01M 4/62* | (2006.01) |

(52) U.S. Cl.
CPC ........... *H01M 4/662* (2013.01); *H01M 4/663* (2013.01); *H01M 4/667* (2013.01); *C01B 2202/08* (2013.01); *C01B 2202/22* (2013.01); *H01G 11/36* (2013.01); *H01G 11/48* (2013.01); *H01G 11/86* (2013.01); *H01M 4/045* (2013.01); *H01M 4/0466* (2013.01); *H01M 4/133* (2013.01); *H01M 4/137* (2013.01); *H01M 4/1393* (2013.01); *H01M 4/1399* (2013.01); *H01M 4/602* (2013.01); *H01M 4/625* (2013.01); *H01M 4/661* (2013.01); *H01M 4/666* (2013.01)

(58) Field of Classification Search
CPC ...... H01M 4/663; H01M 4/666; H01M 4/667; H01M 4/045; H01M 4/137; H01M 4/133; H01M 4/1399; H01M 4/602; H01M 4/625; H01M 4/1393; H01G 11/48; H01G 11/36; H01G 11/86; C01B 2202/08; C01B 2202/22
See application file for complete search history.

(56) References Cited

U.S. PATENT DOCUMENTS

| | | | | |
|---|---|---|---|---|
| 2008/0010796 | A1* | 1/2008 | Pan | H01M 4/133 29/25.03 |
| 2011/0242731 | A1* | 10/2011 | Fleischer | H01G 11/26 361/502 |
| 2013/0189586 | A1* | 7/2013 | Sarrazin | B82Y 10/00 429/232 |
| 2016/0289826 | A1 | 10/2016 | Boulanger et al. | |
| 2018/0266003 | A1* | 9/2018 | Brousse | H01M 10/0565 |

FOREIGN PATENT DOCUMENTS

| | | |
|---|---|---|
| WO | 2012004317 A1 | 1/2012 |
| WO | 2015071408 A1 | 5/2015 |

OTHER PUBLICATIONS

Snook et al., "Conducting-polymer-based supercapacitor devices and electrodes," 2011, Journal of Power Sources, 196, 1-12. (Year: 2011).*
International Search Report for PCT/FR2018/050473 dated Apr. 19, 2018.
Written Opinion for PCT/FR2018/050473 dated Apr. 19, 2018.
Search Report for French Application No. 1751669 dated Sep. 28, 2017.
Yoshikawa, Naoki et al., "An efficient fabrication of vertically aligned carbon nanotubes on flexible aluminum foils by catalyst-supported chemical vapor deposition", In: Nanotechnology, May 9, 2008, vol. 19, pp. 1-5.
Dofler, S. et al., "High power supercap electrodes based on vertically aligned carbon nanotubes on aluminum" In: Journal of Power Sources, 2013, vol. 227, pp. 215-228.
Arcila-Valez, Margarits R. et al, "Roll-to-roll synthesis of vertically aligned carbon nanotube electrodes for electrical double layer capacitors" In: Nano Energy, May 10, 2014, vol. 8, pp. 9-16.
Liatard, S. et al., "Vertically aligned carbon nanotubes on aluminum as a light-weight positive electrode for lithium-polysulfide batteries" In: The Royal Society of Chemistry, 2015.
Lagoutte, S. et al, "Poly(3-methylthiophene)/vertically aligned multi-walled carbon nanotubes: electrochemical synthesis, characterizations and electrochemical storage properties in ionic liquids" In: Electrochimica Acta, 2014, vol. 130, pp. 754-765.
Warren, Roseanne et al., "Electrochemically synthesized and vertically aligned carbon nanotube- polypyrrole nanolayers for high energy storage devices" In: Sensors and Actuators A; Physical, 2015, vol. 231, pp. 65-73.
Küuhnel, Ruben-Simon et al., "Comparison of the anodic behavior of aluminium current collectors in imide based ionic liquids and consequences on the stability of high voltage supercapacitors" In: Journal of Power Sources, 2014, vol. 249, pp. 163-171.
Huang, Fan et al, "Exploring aligned-carbon-nanotubes@polyaniline arrays on household al as supercapacitors" In: CHEMSUSCHEM, 2012, vol. 5, pp. 888-895.
Zang, Hao et al., "Tube-covering-tube nanostructured polyaniline/ carbon nanotube array composite electrode with high capacitance and superior rate performance as well as good cycling stability" In: Elechtrochemistry Communications, 2008, vol. 10, 1056-1059.
Lagoutte, S. et al. "Electrochemical and optical properties of poly(3,4-dimethylthiophene) and its copolymers with 3,4-methylthiophenein ionic liquids media" In: Electrochimica Acta, 2013, vol. 106, pp. 13-22.
Liu, Keke et al., 2008, "Electropolymerization of high stable poly(3,4-ethylenedioxythiophene) in ionic liquids and its potential applications in electrochemical capacitor" Journal of Power Sources, 2008, vol. 179, pp. 858-862.
Cai, Xiaoyi et al., "Binary metal sulfides and polypyrrole on vertically aligned carbon nanotube arrays/carbon fiber paper as high-performance electrodes" In: Journal of Materials Chemistry A, Nov. 2015, vol. 3, No. 44, pp. 21949-22464.
Kim, Y.-G., et al., "Advanced p- and n-Dopable Polymer Supercapacitors", Clean Technology 2011, pp. 123-126, Crosslink, St. Louis, MO, USA.

* cited by examiner

METHOD FOR THE PREPARATION OF AN ELECTRODE COMPRISING AN ALUMINIUM SUBSTRATE, ALIGNED CARBON NANOTUBES AND AN ELECTROCONDUCTIVE ORGANIC POLYMER, THE ELECTRODE AND USES THEREOF

CROSS-REFERENCE TO RELATED APPLICATIONS

This is a National Stage application of PCT international application PCT/FR2018/050473, filed on Feb. 28, 2018, which claims the priority of French Patent Application No. 17 51669, filed Mar. 1, 2017, both of which are incorporated herein by reference in their entireties.

TECHNICAL FIELD

The present invention belongs to the field of devices for storing and restoring electrical energy and more specifically to the field of electrodes notably useful for supercapacitors.

Indeed, the present invention relates to a method for preparing an electrode having (i) a support made of a material including aluminium, (ii) vertically aligned carbon nanotubes on said support and (iii) an electrically conductive organic polymer.

The present invention also relates to said electrode thereby prepared and the different uses thereof and notably in a supercapacitor.

PRIOR ART

To enable the rapid expansion of renewable energies, the storage of electricity is one of the greatest challenges to face. Among the numerous autonomous sources, supercapacitors, based on rapid charge/discharge cycles of ions on carbon surfaces, lie between capacitors and batteries. Their high storage efficiency (>95%), their safety, their reliability and their lifetime make them good candidates to complete or replace existing solutions.

Supercapacitors, the market for which is booming, have two electrodes i.e. an anode and a cathode, which are electrically insulated by a separator, an electrolyte being arranged between each electrode and the separator.

One of the important parameters for a supercapacitor is the capacitance of the system. The latter mainly depends on the correlation between the materials selected for the electrodes, on the design of these electrodes and on the electrolyte.

In commercially available supercapacitors, the surface of the electrodes is composed of activated carbon. The latter is a porous material, electron conducting, electrochemically stable and providing a high surface area per unit of volume i.e. greater than 500 $m^2 \cdot g^{-1}$. However, the porosity of activated carbon is difficult to control: it depends, on the one hand, on the porosity of the raw material used such as carbon rich vegetable organic matter and, on the other hand, on the physical or chemical activation method implemented. The existence of a complex and poorly controlled porosity in the activated carbon but also the existence of undesirable functional groups on its surface affect the capacitance and the performances of supercapacitors made of activated carbon.

In this context, the use of nanomaterials well organised at the nanometric scale such as vertically aligned carbon nanotubes (or VACNTs) is very promising. Several electrode materials based on VACNTs have demonstrated interesting specific capacitances, thereby validating the interest of such a configuration (alignment and regular spacing of the nanotubes in the material) in terms of energy savings and especially power of the supercapacitor.

Among known methods for manufacturing VACNTs, the CVD (Chemical Vapour Deposition) technique may be favoured because of relatively low cost compared to the other manufacturing methods known to operate at very high temperature (laser ablation and discharge of electric arc) and with regard to the need to industrialise the manufacture of electrodes for supercapacitors. In a known manner, one of the alternatives of the CVD technique consists in injecting, simultaneously and continuously (known as co-injection), into a heated reactor, a carbon precursor and a catalytic precursor on a support which can be made of different materials such as a support made of quartz, silica, carbon or a metal support such as steel.

Within the context of supercapacitors, the metal support on which the VACNTs are prepared is used as current collector. To minimise the weight of the electrodes and, consequently, the weight of the supercapacitors, light metal supports such as aluminium supports are to be favoured.

However, to grow VACNTs by the CVD technique on aluminium supports, it is advisable to take into account the specificities of such a support and notably the melting temperature of aluminium which is 660° C. The growth process being thermoactivated, lowering the synthesis temperature leads to a reduction in the growth rates. To limit this phenomenon, it is necessary to turn towards precursors, the thermal and catalytic decomposition of which is more favourable at temperatures of the order of 600° C. To this end, the international application WO 2015/071408 proposes a method for growing VACNTs on different supports such as, for example, aluminium supports by lowering their growth temperature and by the use of suitable carbon sources [1]. Yoshikawa et al, 2008 have obtained VACNTs, the length of which can reach 90 µm on an aluminium sheet using ethanol in combination with catalytic iron and cobalt particles at a growth temperature of around 650° C. under a flow of argon/hydrogen [2]. Dorfler et al, 2013 have also proposed a method for preparing VACNTs on an aluminium sheet coated with catalysts by CVD at atmospheric pressure and at 645° C. using ethylene as carbon source [3]. Similarly, Arcila-Velez et al, 2014 disclose a deposition of VACNTs by CVD on an aluminium substrate of very low thickness (16 µm) from a mixture of carbon (xylene, acetylene) and catalytic (ferrocene) precursors in the presence of gas (argon and hydrogen) [4]. In addition, Liatard et al, 2015 have prepared VACNTs, on aluminium coated with iron, via a CVD method at a growth temperature of 450° C. combined with a heating by 700 W hot filaments with, as carbon precursor, acetylene and in the presence of gas (argon and hydrogen) [5]. Finally, Huang et al, 2012 describe an electrode including an aluminium support on which VACNTs have been synthesised [6]. This synthesis is carried out by two chemical vapour deposition alternatives, one carried out at a temperature of 640° C. to obtain short VACNTs and the other called "floating catalytic CVD technique" at 645° C. for longer VACNTs. VACNTs of around 10 µm or around 50 µm are thereby obtained. It should be noted that these methods and notably those described in [1] and [5] make it possible to obtain very dense VACNTs.

To increase the stored energy of VACNTs, one of the solutions consists in combining them with electroactive materials such as electron conductive polymers (ECPs). This is then known as pseudocapacitance. In this case, the energy is stored by two simultaneous processes: electrostatic process and redox process. Recently, new positive pseudocapacitive electrode materials based on VACNTs modified by ECPs have demonstrated a high specific capacitance [7, 8, 9]).

In the international application WO 2012/004317 [7], the electropolymerisation is carried out in pulsed galvanostatic mode using varied electrolytic solutions containing as solvent either a protic or aprotic solvent, or an ionic liquid. Furthermore, a nanostructuring of the ECPs and an increase of their capacitive properties in certain conditions have been shown, when these polymers are electropolymerised using an electrolytic solution of which the solvent is an ionic liquid [10, 11].

Applying the electrodeposition technique described in [7, 10, 11] on VACNTs of which the surface density is very high such as those obtained on aluminium substrates and according to the protocol notably described in [1] may prove to be problematic. Such a density can prevent obtaining a deposition of ECPs over the entire depth of the VACNT carpet.

Indeed, the solvents and notably the solvents based on ionic liquid typically employed in these electrochemical methods have several drawbacks for very dense VACNTs and obtained on aluminium substrates such as a high viscosity or a risk of corrosion of the aluminium substrate [12]. In this case, the performances in storage capacitance and in cyclability would be, in particular, greatly diminished. To this end, it should be noted that, in [6], polyaniline is electrodeposited, on the VACNTs synthesised on the aluminium support, by cyclic voltammetry from an aqueous solution containing 1 M of sulphuric acid and 0.1 M of aniline.

On account of the increasing interest in supercapacitors, the inventors have set themselves the aim of proposing an industrialisable method making it possible to obtain an electrode notably intended to be used in a supercapacitor which has (i) an aluminium support, (ii) VACNTs on said support and (iii) an electrically conductive organic polymer deposited on said VACNTs. Such a method must not lead to any corrosion of the aluminium support, be suitable for dense VACNTs and make it possible to obtain electrodes having properties identical to those of the electrodes of the prior art and even improved compared to the latter.

DESCRIPTION OF THE INVENTION

The present invention makes it possible to resolve the technical problems as defined previously and to attain the aim that the inventors have set themselves.

Indeed, the works of the inventors have made it possible to develop an industrialisable method making it possible to obtain an electrode with a support based on aluminium on which carbon nanotubes are vertically aligned and coated with electrically conductive organic polymers, said electrode having interesting performances in terms of capacitance for notably an application in a supercapacitor. As a reminder, the capacitance is the property of an electrical conductor to contain a certain level of electrical charge for a determined electrical potential.

More specifically, the present invention relates to a method for the preparation of an electrode including a support made of an aluminium based material, vertically aligned carbon nanotubes and an electrically conductive polymer matrix, said method including the following successive steps:

a) synthesising, on a support made of an aluminium based material, a carpet of vertically aligned carbon nanotubes according to the CVD (Chemical Vapour Deposition) technique at a temperature less than or equal to 650° C.;

b) electrochemically depositing said matrix polymer on said carbon nanotubes from an electrolytic solution including at least one precursor monomer of said matrix, at least one ionic liquid and at least one protic or aprotic solvent.

The inventors have associated, with the synthesis of a VACNT carpet via the CVD technique at a temperature less than or equal to 650° C. adapted to be applied on a light support based on aluminium, an electrochemical deposition of electrically conductive polymers in particular conditions making it possible to obtain a deposition in the thickness of the VACNT carpet and to do so without eroding said support. These particular conditions are linked to the physical-chemical properties of the electrolytic solution. In addition, this electrochemical deposition technique is no longer limited to the pulsed galvanostatic technique as described in [7]. Conversely, in the present invention, any electrochemical deposition technique can be used whether this method is cyclic or pulsed with, in the latter case, the current or voltage imposed.

Within the scope of the present invention, the particular solvent implemented during the electrochemical deposition is a mixture of at least one ionic liquid and at least one protic or aprotic solvent. Even if the addition of a protic or aprotic solvent to an ionic liquid makes it possible to decrease the viscosity of the electrolytic solution, it was not at all obvious that such a mixture is suitable for preparing the electrode such as defined in the invention. Conversely, surprisingly, despite the corrosive character of the salts that this electrolytic solution can contain vis-à-vis aluminium known from [12] and illustrated in paragraph II of the experimental part hereafter, it makes it possible to prepare an electrode having good performances and thus particularly suited to use in a supercapacitor. Furthermore, the fact of using, as solvent, a mixture of at least one ionic liquid and at least one protic or aprotic solvent makes it possible to increase the range of electropolymerisable monomers compared to the aqueous solution of sulphuric acid implemented in [6].

In the method according to the present invention, a support made of an aluminium based material is used for the previously mentioned reasons i.e. lightness of the electrode and this is done in order to have a light supercapacitor. "Aluminium based material" is taken to mean not only a material made of non-alloyed aluminium but also a material made of aluminium alloy such as an alloy of aluminium and magnesium, an alloy of aluminium and manganese, an alloy of aluminium and copper, an alloy of aluminium and silicon, an alloy of aluminium, magnesium and silicon or an alloy of aluminium and zinc.

The support implemented in the invention has any shape i.e. a shape adapted to the later use of the electrode. As illustrative examples, this support may have a flat shape, a wire shape (wire or grid), a strip shape, a hollow cylindrical shape or an alveolar shape (foam). Typically, the support implemented in the invention has a thickness comprised between 1 μm and 500 μm, notably between 2 μm and 200 μm, in particular, between 5 μm and 100 μm and, more particularly, between 10 μm and 75 μm.

Step (a) of the method according to the invention consists in synthesising, on the aluminium based support, vertically aligned carbon nanotubes and extending perpendicularly to the surface of the support thereby forming a carpet of nanotubes the base of which corresponds to the support.

The synthesis method implemented i.e. using the CVD (Chemical Vapour Deposition) technique at a temperature less than or equal to 650° C. is notably one of the methods described in [1, 2, 3, 4, 5, 6]. Since these techniques can be carried out by batch to batch technique/roll to roll technique, they are easily industrialisable.

Briefly, this synthesis takes place in the presence of a catalytic source and a carbon source. The catalytic source may be pre-deposited on the support or, conversely, be co-injected with the carbon source. The catalytic source is notably selected from transition metal metallocenes such as, for example, ferrocene, nickelocene, cobaltocene or any of the mixtures thereof. The carbon source which may be liquid, solid or gaseous is notably selected from hydrocarbons, alcohols, carbon monoxide, carbon halides, toluene, cyclohexane, vegetable based oils, benzylamine, acetonitrile, ethylene, acetylene, xylene, methane and any of the mixtures thereof. In a particular embodiment of this synthesis, the ferrocene is conveyed into the reactor by means of a toluene solution in the form of an aerosol.

Within the scope of step (a) of the method according to the invention, this synthesis is advantageously carried out at a temperature comprised between 500° C. and 620° C. Similarly, this synthesis is typically carried out at a pressured comprised between $10^3$ Pa and $10^5$ Pa and, in particular, between $0.9 \cdot 10^5$ Pa and $10^5$ Pa.

As a function of the particular protocol used for the synthesis of the carbon nanotubes during step (a) of the method, the density of the vertically aligned carbon nanotubes extending perpendicularly to the support made of an aluminium based material may be variable. The latter is advantageously comprised between $10^6$ and $1013$ nanotubes·$cm^{-2}$ of support. It is thereby possible to have a material having a dense carpet of vertically aligned carbon nanotubes, with of the order of $10^8$ to $10^{12}$ nanotubes·$cm^{-2}$ and notably of the order of $10^{11}$ to $10^{12}$ nanotubes·$cm^2$.

Similarly, following the synthesis of the vertically aligned carbon nanotubes and prior to step (b), the vertically aligned carbon nanotubes may be subjected to an oxidising treatment (or pre-treatment) i.e. aiming to oxidise the surface of the nanotubes implemented and/or to prepare the surface for a future oxidation by formation of radicals. An oxidation modifies the surface of the nanotubes notably by fixing and/or by introducing, on the ends or on defects of the nanotubes, oxygen rich groups such as groups of carboxylic (—COOH), hydroxyl (—OH), alkoxyl (—OX with X representing an alkyl group, an acyl group or an aroyl group), carbonyl (—C=O), percarbonic (—C—O—OH) and sometimes amide (—CONH) type.

Such an oxidising treatment is based on two major types of surface modifications based on:
physical treatments such as a treatment by plasma notably of oxygen, a UV treatment, an X or γ ray treatment, a treatment by irradiation with electrons and with heavy ions, or
chemical treatments such as a treatment with alcoholic potash, a treatment by a strong acid (HCl, $H_2SO_4$, $HNO_3$, $HClO_4$), a treatment with soda, a treatment by a strong oxidiser ($KMnO_4$, $K_2Cr_2O_7$, $KClO_3$ or $CrO_3$ in hydrochloric acid, sulphuric acid or nitric acid), an ozone treatment and a heat treatment under oxygenated atmosphere ($O_2$, $H_2O$, etc.).

Such nanotubes, once this oxidising treatment has been implemented, may be in the form of surface modified nanotubes such as, for example, negatively charged nanotubes.

Step (b) of the method according to the present invention consists in applying, in an electrochemical manner, on the carpet of carbon nanotubes synthesised during step (a) on the support made of an aluminium based material, an electrically conductive polymer matrix.

"Electrically conductive polymer matrix" is taken to mean, within the scope of the present invention, a structure being in the form of a film (or sheath), porous or non-porous, on the surface of the carbon nanotubes implemented in the method of the invention and essentially constituted of one (or more) electrically conductive (co)polymer(s). In the carpet of carbon nanotubes such as obtained following step (a) of the method, the polymer matrix is associated with the carbon nanotubes while being deposited on and at the level of the lateral surface of the carbon nanotubes, advantageously being able to form a sheath around the nanotubes. Typically, advantageously, the thickness of this sheath is homogenous for a carbon nanotube and, in a more advantageous manner, it is homogenous for all of the carbon nanotubes of the carpet.

"Electrically conductive (co)polymer" is taken to mean, within the scope of the present invention, a (co)polymer of which the main polymeric chain and optionally the side chains have at least one double bond or at least one aromatic cycle. Typically, an electrically conductive (co)polymer is obtained by polymerisation of one (or more) monomer(s) bearing a double bond and/or an aromatic cycle and optionally a heteroatom such as an oxygen atom, a nitrogen atom, a sulphur atom or a fluorine atom.

The polymer matrix implemented within the scope of the present invention is advantageously constituted of one (or more) (co)polymer(s) selected from polyfluorenes, polypyrenes, polynaphthalenes, polypyrroles, polycarbazoles, polyindoles, polyazepines, polyanilines, polythiophenes, or ABA type polymers composed of an aromatic unit B such as benzene, thiophene, pyrrole, carbazole, fluorene, optionally functionalised by alkyl, alkoxy, oligoether, thioether chains, or conjugated alkene or alkyne and electropolymerisable A units of the thiophene, alkylthiophene, 3,4-alkylenedioxythiophene type and derivatives thereof or pyrrole, alkylpyrrole, N-alkylpyrrole, 3,4-alkylenedioxypyrrole type and derivatives thereof.

Advantageously, the matrix polymer implemented within the scope of the present invention is advantageously constituted of one (or more) (co)polymer(s) selected from polypyrroles, polycarbazoles, polyanilines and polythiophenes.

Those skilled in the art know different precursor monomers that can be used to obtain, by polymerisation, the polymers listed above.

As examples, polypyrroles may be obtained by polymerisation of one (or more) monomer(s) selected from pyrrole and derivatives of pyrrole. A pyrrole derivative is advantageously a pyrrole substituted by at least one substituent selected from a linear, branched or cyclic, C1 to C10 and notably C1 to C5 (hetero)alkyl, optionally substituted; a halogen atom; a —OH group; a —COOH group; a C2 to C20 and notably C2 to C10 alkoxyalkyl, optionally substituted; a polyalkoxy ether; a polyalkylene ether; a C3 to C20 and notably C4 to C16 (hetero)aryl, optionally substituted or a C3 to C20 and notably C4 to C16 (hetero)aralkyl, optionally substituted. Such a pyrrole derivative is notably an alkylpyrrole, an N-alkylpyrrole or a 3,4-alkylenedioxypyrrole. A pyrrole derivative may also be a pyrrole substituted by at least two substituents forming a C1 to C10 and notably C1 to C5 bridging group optionally including a heteroatom. As examples of pyrrole derivatives that can be used may be cited 3-methyl pyrrole, 3-ethyl pyrrole, 3-butyl pyrrole, 3-bromo pyrrole, 3-methoxy pyrrole, 3,4-dichloro pyrrole and 3,4-dipropoxy pyrrole.

"Optionally substituted" is taken to mean, within the scope of the present invention, a group that can be substituted by —OH, —COOH, a halogen atom or a C1 to C4 alkyl.

As examples, polycarbazoles may be obtained by polymerisation of one (or more) monomer(s) selected from carbazole and derivatives of carbazole. A carbazole derivative is advantageously a carbazole substituted by at least one substituent selected from a linear, branched or cyclic C1 to C10 and notably C1 to C5 (hetero)alkyl, optionally substituted; a halogen atom; a —OH group; a —COOH group; a C2 to C20 and notably C2 to C10 alkoxyalkyl, optionally substituted; a polyalkoxy ether; a polyalkylene ether; a C3 to C20 and notably C4 to C16 (hetero)aryl, optionally substituted or a C3 to C20 and notably C4 to C16 (hetero)aralkyl, optionally substituted. A carbazole derivative may also be a carbazole substituted by at least two substituents forming a C1 to C10 and notably C1 to C5 bridging group optionally including a heteroatom.

As examples, polyanilines may be obtained by polymerisation of one (or more) monomer(s) selected from aniline and derivatives of aniline. An aniline derivative is advantageously an aniline substituted by at least one substituent selected from a linear, branched or cyclic, C1 to C10 and notably C1 to C5 (hetero)alkyl, optionally substituted; a halogen atom; a —OH group; a —COOH group; a C2 to C20 and notably C2 to C10 alkoxyalkyl, optionally substituted; a polyalkoxy ether; a polyalkylene ether; a C3 to C20 and notably C4 to C16 (hetero)aryl, optionally substituted or a C3 to C20 and notably C4 to C16 (hetero)aralkyl, optionally substituted. An aniline derivative may also be an aniline substituted by at least two substituents forming a C1 to C10 and notably C1 to C5 bridging group optionally including a heteroatom.

As examples, polythiophenes may be obtained by polymerisation of one (or more) monomer(s) selected from thiophene and derivatives of thiophene. A thiophene derivative is advantageously a thiophene substituted by at least one substituent selected from a linear, branched or cyclic, C1 to C10 and notably C1 to C5 (hetero)alkyl, optionally substituted; a halogen atom; a —OH group; a —COOH group; a C2 to C20 and notably C2 to C10 alkoxyalkyl, optionally substituted; a polyalkoxy ether; a polyalkylene ether; a C3 to C20 and notably C4 to C16 (hetero)aryl, optionally substituted or a C3 to C20 and notably C4 to C16 (hetero)aralkyl, optionally substituted. Among thiophenes substituted by at least one C3 to C20 (hetero)aryl may be cited thiophenes substituted by at least one C3 to C20 perfluorinated aryl. A thiophene derivative may also be a thiophene substituted by at least two substituents forming a C1 to C10 and notably C1 to C5 bridging group optionally including a heteroatom. As examples of thiophene derivatives that can be used may be cited 3-thiophene acetic acid, 3,4-ethylenedioxythiophene, 3-methylthiophene, 3,4-dimethylthiophene, 3-ethylthiophene, 3-butylthiophene, 3-bromothiophene, 3-methoxythiophene, 3,4-dimethoxythiophene, 3,4-dichlorothiophene, 3,4-dipropoxythiophene and 3-perfluorophenylthiophene.

Advantageously, step (b) of the method according to the invention includes the sub-steps consisting in:

$b_1$) putting into contact the carbon nanotubes synthesised on a support made of an aluminium based material such as defined previously with an electrolytic solution containing the precursor monomer(s) of said conductive polymer matrix, at least one ionic liquid and at least one protic or aprotic solvent;

$b_2$) polarising said carbon nanotubes whereby said conductive polymer matrix is electrochemically deposited on said carbon nanotubes.

As explained previously, the essential elements of the electrolytic solution implemented in the method according to the invention are one or more different monomer(s), precursor(s) of the electrically conductive polymer matrix, at least one ionic liquid and at least one protic or aprotic solvent.

Within the scope of the present invention, an "ionic liquid" is an organic salt in a liquid state at a temperature below 100° C. and notably in a liquid state at room temperature (i.e. 22° C.±5° C.).

Among these ionic liquids may be cited ionic liquids having at least one protic or aprotic cation, substituted or not, selected from the family of pyridinium, pyridazinium, pyrimidinium, pyrazinium, imidazolium, pyrazolium, thiazolium, oxazolium, triazolium, ammonium, pyrrolidinium, pyrrolinium, pyrrolium, piperidinium and at least one anion, organic or not, substituted or not, selected from $F^-$; $Cl^-$, $Br^-$; $I^-$; $NO_3^-$; $N(CN)_2^-$; $BF_4^-$; $ClO_4^-$; $PF_6^-$; $RSO_4^-$; $RSO_3^-$; $RCOO^-$ where R is an alkyl or phenyl group; $(CF_3)_2PF_4^-$; $(CF_3)_3PF_3^-$; $(CF_3)_4PF_2^-$; $(CF_3)_5PF^-$; $(CF_3)_6P^-$; $(CF_2SO_3^-)_2$; $(CF_2CF_2SO_3^-)_2$; $(CF_3SO_2)_2N^-$; $CF_3CF_2(CF_3)_2CO^-$; $(CF_3SO_2)_2CH^-$; $(SF_5)_3C^-$; $(CF_3SO_2)_3C^-$; $[O(CF_3)_2C_2(CF_3)_2O]_2PO^-$; $CF_3(CF_2)_7SO_3^-$; $CNSe^-$; $CNS^-$; bis(oxalato)borate and an anion derivative of imidazole.

Other examples of cations that can be used for the ionic liquid implemented in the present invention are described in the international patent WO 2012/004317 [7] (page 24, lines 1 to 22). Similarly, other ionic liquids that can be used within the scope of the present invention are described in the international patent WO 2008/016990 [13] (page 18, lines 5 to 23).

Advantageously, the ionic liquid implemented within the scope of the present invention is selected from the group constituted by a dialkylpyrrolidinium bis(trifluoromethylsulphonyl)imide aDAPyr][TFSI]), a dialkylpyrrolidinium bis(fluoromethylsulphonyl)imide ([DAPyr][FSI]), a dialkylpyrrolidinium tetrafluoroborate ([DAPyr][BF4]), a dialkylpyrrolidinium hexafluorophosphate ([DAPyr][PF6]), a dialkylpyrrolidinium selenocyanate ([DAPyr][SeCN]), a dialkylpyrrolidinium thiocyanate ([DAPyr][SCN]), a dialkylpyrrolidinium bromide ([DAPyr][Br]), 1-ethyl-3-methylimidazolium bis(trifluoromethylsulphonyl)imide ([EMI][TFSI]), 1-ethyl-3-methylimidazolium bis(fluoromethylsulphonyl)imide ([EMI][FSI]), 1-ethyl-3-methylimidazolium tetrafluoroborate ([EMI][BF4]), 1-ethyl-3-methylimidazolium hexafluorophosphate ([EMI][PF6]), 1-ethyl-3-methylimidazolium selenocyanate ([EMI][SeCN]), 1-ethyl-3-methylimidazolium thiocyanate ([EMI][SCN]), 1-butyl-3-methylimidazolium bis(trifluoromethylsulphonyl)imide ([BMI][TFSI]), 1-butyl-3-methylimidazolium tetrafluoroborate ([BMI][BF4]), 1-butyl-3-methylimidazolium hexafluorophosphate ([BMI][PF6]), 1-methyl-3-n-hexylimidazolium iodide ([MHIm][I]) and butyltrimethylammonium bis(trifluoromethylsulphonyl)imide ([BtMA][TFSI]).

"Protic solvent" is taken to mean, within the scope of the present invention, a solvent that comprises at least one hydrogen atom capable of being released in the form of a proton and advantageously selected from the group constituted by water, deionised water, distilled water, acidified or basic, acetic acid, hydroxylated solvents such as methanol and ethanol, low molecular weight liquid glycols such as ethylene glycol, and mixtures thereof.

"Aprotic solvent" is taken to mean, within the scope of the present invention, a solvent which is not capable of releasing a proton or accepting a proton in non-extreme conditions and advantageously selected from halogenated alkanes such as dichloromethane; dimethylformamide (DMF); ketones such as acetone or 2-butanone; acetonitrile; propylene carbonate, gamma-butyrolactone (GBL), tetrahydrofuran (THF); N-methylpyrrolidone (NMP); dimethyl sulphoxide (DMSO) and mixtures thereof.

In a particular embodiment, the solvent of the electrolytic solution implemented in the method according to the invention is a mixture of at least one ionic liquid such as defined previously and at least one protic solvent such as defined previously.

In another particular embodiment, the solvent of the electrolytic solution implemented in the method according to the invention is a mixture of at least one ionic liquid such as defined previously and at least one aprotic solvent such as defined previously. In particular, in this embodiment, the aprotic solvent is acetonitrile, the ionic liquid being able to be any of the ionic liquids envisaged previously.

The proportions of ionic liquid and protic or aprotic solvent in the electrolytic solution implemented in the present invention vary as a function of the viscosity of the ionic liquid in order to conserve a low overall viscosity for this solution ensuring good diffusion of species within the liquid medium filling the inter-tube spaces. These proportions may be 30 to 85% by volume for the protic or aprotic solvent and the complement to 100% for the ionic liquid. Thus, the mixture may comprise between 65 and 85% by volume of protic or aprotic solvent and between 15 and 35% by volume of ionic liquid and notably around 75% (i.e. 75%±5%) by volume of protic or aprotic solvent and around 25% (i.e. 25%±5%) by volume of ionic liquid. A particular example of such a mixture is a mixture of around 75% by volume of acetonitrile and around 25% of [EMI][TFSI] or [EMI][BF4]. Alternatively, the mixture may comprise between 40 and 60% by volume of protic or aprotic solvent and between 40 and 60% by volume of ionic liquid and notably around 50% (i.e. 50%±5%) by volume of protic or aprotic solvent and around 50% (i.e. 50%±5%) by volume of ionic liquid. A particular example of such a mixture is a mixture of around 50% by volume of acetonitrile and around 50% of [EMI][TFSI] or [EMI][BF4].

The precursor monomer(s) of the conductive polymer matrix is (are) present in the electrolytic solution in a maximum quantity determined with respect to their solubility in the solvent employed i.e. the mixture of at least one ionic liquid and at least one protic or aprotic solvent.

As mentioned previously, the electrolytic solution must have a viscosity adapted to enable a penetration between the carbon nanotubes (inter-tube spacing comprised between several nm and one hundred nm) in a homogeneous manner over the entire thickness of the carpet comprised generally between several microns and several hundreds of microns. The viscosity of the electrolytic solution implemented within the scope of the invention strongly depends on the nature and the proportion of ionic liquid in the latter. Typically, this viscosity is comprised between 0.37 mPa·s and 200 mPa·s and advantageously between 1.0 mPa·s and 36 mPa·s in standard conditions of temperature and pressure.

As indicated previously, the electrochemical deposition of the electrically conductive polymer matrix on the carbon nanotubes during step (b) or during sub-step ($b_2$) of the method according to the invention may involve either a cyclic method, or a static method, pulsed or not with either the voltage or the current that is imposed. In a particular embodiment, it is possible to carry out this electrochemical deposition by combining these different methods. In other words, the deposition method by electrochemical process can be carried out by a cyclic method and/or a pulsed or continuous galvanostatic method and/or a pulsed or continuous potentiostatic method. The deposition method consists in oxidising a precursor monomer present in the electrolyte to polymerise it and to ensure its deposition in the form of an electroconductive polymer around and on the carbon nanotubes.

The electrochemical deposition during step (b) or during sub-step ($b_2$) of the method according to the invention is typically carried out in an electrochemical cell equipped with two electrodes (working electrode and counter-electrode) or three electrodes (working electrode, counter-electrode and reference electrode). The working electrode (or anode) corresponds to the aluminium support provided with carbon nanotubes, whereas the counter-electrode (or cathode) is, for example, a platinum grid or a platinated titanium plate or a paste of carbon black and activated carbon encapsulated in a stainless steel grid or a paste of carbon black, activated carbon and Teflon encapsulated in a stainless steel grid for the electrical contact. The counter-electrode has a surface and a capacitance adapted to the surface and to the capacitance of the working electrode. When it is present, the reference electrode, which makes it possible to know, at any moment, the voltage value at the level of the working electrode, is typically made of metal such as, for example, a silver wire or a platinum wire.

The electrochemical device implemented in the invention includes an electrochemical cell such as defined previously associated with a current or voltage generator.

The cyclic method of electrochemical deposition or cyclic voltammetry consists in varying the potential of the working electrode at a given scanning rate. The applied voltage range is selected as a function of the desired range of potentials for the working electrode. Advantageously, during step (b) or during sub-step ($b_2$) of the method according to the invention, the voltage can vary from $-3$ to $+3$ V as a function of the selected monomer and electrolyte. The current varies as a function of the size of the sample in such a way that the current density is of the order of 10 mA·cm$^{-2}$. The scanning rate is notably comprised between 2 and 500 mV/s, in particular, between 3 and 100 mV/s and, more particularly, between 5 and 20 mV/s. The number of cycles is notably comprised between 15 and 200 and, in particular, between 25 and 150. As illustrative examples of conditions used during cyclic voltammetry for the 3-methylthiophene (3MT) monomer, may be cited:

a voltage imposed between $-0.5$ and 1.5 V at a scanning rate of 20 mV/s for 50 cycles; or a voltage imposed between $-0.2$ and 1.4 V at a scanning rate of 5 mV/s for 100 cycles.

The pulsed potentiostatic or pulsed galvanostatic method consists in sequencing times of depositing the electroconductive polymer ($t_{ON}$) and rest times ($t_{OFF}$) by applying, between the cathode and the anode, a voltage or respectively a current. Within the scope of the method according to the invention, the deposition time corresponds to the oxidation of the precursor monomer. This oxidation takes place by imposing either a current for a given time ($t_{ON}$) (chronopotentiometry), or a voltage for a given time ($t_{ON}$) (chronoamperometry). During $t_{OFF}$, the monomer is not oxidised which leaves it the time to diffuse within the carpet of carbon nanotubes. This rest time $t_{OFF}$ can be obtained by opening of the electrical circuit or by imposing a current or a voltage lower than that imposed during the deposition time $t_{ON}$ and not making it possible to oxidise the monomer. During this rest time $t_{OFF}$, an agitation of the electrolytic solution may be implemented to facilitate the diffusion of the monomer within the carpet of vertically aligned carbon nanotubes.

The current or voltage generator of the device is capable of delivering a pulsed current or a voltage in a discontinuous manner, notably during periods $t_{ON}$ of the order of 5 ms to 10 s, for example of the order of 250 ms (i.e. 250 ms±20 ms), and periods $t_{OFF}$ such as between 50 ms and 10 s, for example of the order of 1.50 s (i.e. 1.50 s±150 ms). The ratio $t_{ON}/t_{OFF}$ is generally comprised between 1/60 and 2 and, in particular, between 1/10 and 1.

In the case of pulsed or non-pulsed chronopotentiometry, the current imposed during the deposition time $t_{ON}$ corresponds to a determined value which is adapted in order to obtain a sufficient voltage to oxidise the precursor monomer. This determined value is a function of the type of precursor monomers implemented and the viscosity of the electrolytic solution. For example, in the case of the 3MT monomer, for a coverage surface area by the carbon nanotubes of the order of 1 cm$^2$, and for an electrolytic solution the solvent of which is composed of acetonitrile (75% by volume) and EMITFSI (25% by volume), the determined value of the current is around 4 mA. The ratio $t_{ON}/t_{OFF}$ may for example vary from 0.05 to 1.

In the case of pulsed or non-pulsed chronoamperometry, the voltage imposed during the deposition time $t_{ON}$ corresponds to a determined value which is adapted in order to obtain a sufficient current to oxidise the precursor monomer. This determined value is a function of the type of precursor monomers implemented and the viscosity of the electrolytic solution. For example, in the case of the 3MT monomer, for a coverage surface area by the carbon nanotubes of the order of 1 cm$^2$, and for an electrolytic solution the solvent of which is composed of acetonitrile (75% by volume) and EMITFSI (25% by volume), the determined value of the voltage is around 1.5 V (i.e. 1.5 V±0.2 V). The ratio $t_{ON}/t_{OFF}$ may vary from 0.05 to 1.

The duration of step (b) or of sub-step (b$_2$) of the method according to the invention implementing either a cyclic voltammetry method, or a potentiostatic or galvanostatic, pulsed or non-pulsed method is variable from several minutes to several hours. Typically, this duration is comprised between 5 min and 8 h, advantageously between 10 min and 4 h and, in particular, between 15 min and 2 h. It depends on the amount of polymer to deposit to have a homogenous deposition around the vertically aligned carbon nanotubes. Those skilled in the art will know how to adapt, without inventive effort, this duration as a function of the density and the length of the vertically aligned carbon nanotubes and the amount of matrix polymer to deposit.

Finally, it is possible to combine the pulsed potentiostatic or pulsed galvanostatic methods. It is for example possible to set firstly the voltage (chronoamperometry) in order to oxidise the electroconductive polymer already deposited during preceding cycles then to set the current (chronopotentiometry) in order to oxidise the monomer, then to leave the electrical circuit open to allow the monomer to diffuse within the vertically aligned carbon nanotubes.

Step (b) and notably sub-step (b$_2$) of the method according to the invention are carried out at a temperature comprised between 15° C. and 100° C. and advantageously at room temperature (i.e. 22° C.±5° C.). The temperature could be adapted as a function of the desired viscosity for the electrolytic solution.

Furthermore, step (b) and notably sub-step (b$_2$) of the method according to the invention can be carried out under non-controlled atmosphere. Alternatively, they can be carried out in an atmosphere having the least possible oxygen and water. To this end, it is possible to envisage carrying out this step and this sub-step under inert atmosphere. To do so, an inert gas such as argon or nitrogen may be employed to generate this inert atmosphere. The use of an inert atmosphere associated with a bubbling of an inert gas into the electrolytic solution makes it possible to eliminate oxygen potentially present in the latter.

It should be noted that the electrochemical deposition during step (b) and notably sub-step (b$_2$) of the method according to the invention may be industrialised, for example by a batch to batch or roll to roll technique with the support made of an aluminium based material bathed in an electrolytic solution such as defined previously.

The duration of step (b) and notably sub-step (b$_2$) of the method according to the invention makes it possible to adjust the percentage by weight of the electrically conductive polymer matrix compared to the total weight of the composite corresponding to the vertically aligned carbon nanotubes coated with this electrically conductive polymer matrix to maximise the capacitance of the composite once manufactured and to do so in order to provide a supercapacitor using such a composite as electrode, which has a capacitance as high as possible. The electrically conductive polymer matrix represents a weight percentage compared to the total weight of said composite which can go up to 99%, notably comprised between 5 and 95% and, in particular, between 10 and 80%. The weight of the electrically conductive polymer matrix and that of the composite may be obtained by GTA (gravimetric thermal analysis) and/or by weighing and/or by integration of the current having traversed the electrical circuit during the polymerisation step.

Following step (b) and notably following sub-step (b$_2$), the method according to the invention may have a rinsing step and optionally a drying step.

The rinsing step has, for main aim, to clean, to remove residues/impurities of monomer or oligomer type which could remain on parts of the support, carbon nanotubes or the matrix polymer and which would not have been deposited. Such residues/impurities could cause problems during the encapsulation step and dysfunctions of the supercapacitor. Advantageously, the rinsing step is carried out by immersing the support in an aluminium based material provided with carbon nanotubes and the electrically conductive polymer matrix in an organic solvent such as acetonitrile, a ketone, ethanol or isopropanol. The rinsing consists in immersing the support in an aluminium based material provided with carbon nanotubes and the electrically conductive polymer matrix in the solvent for a variable time from 2 to 30 min and by renewing the operation if necessary up to five times for example.

In addition, the optional step of drying of the support made of an aluminium based material provided with carbon nanotubes and the electrically conductive polymer matrix may be carried out by leaving the latter, once rinsed, in open air in order that the solvent used for the rinsing evaporates. Alternatively, this drying may be carried out by heating the support made of an aluminium based material provided with carbon nanotubes and the electrically conductive polymer matrix, under vacuum or by means of an infrared lamp. This alternative may be implemented in the case of a continuous method.

The present invention also relates to an electrode capable of being prepared by the method according to the invention such as defined previously. This electrode has a support made of an aluminium based material on a surface of which are found the vertically aligned carbon nanotubes, coated with an electrically conductive polymer matrix. It is thus a single layer electrode.

Such an electrode is clearly distinct from the electrode obtained in [6]. Indeed, as explained previously, the fact that the ECP is electropolymerised, in the present invention, from an electrolytic solution of which the solvent is a mixture of at least one ionic liquid and at least one protic or aprotic solvent brings about a nanostructuring of this ECP and an improvement of its properties [10, 11] compared to an ECP obtained from an electrolytic solution only including as solvent a protic solvent as in [6]. This improvement of the properties of the ECP brings about, hence, an improvement of the properties of the electrode including it. As an example of improvement of the properties of the electrode, the range of potentials may be considered on which it may be used which is 2 V in the present invention (FIG. 3 hereafter), whereas the electrode described in [6] based on polyaniline can only be used over a range below 1 V (FIG. 3(a) of [6]).

Everything that has been previously indicated on the support made of an aluminium based material also applies to the electrode according to the present invention.

Advantageously, the density of the vertically aligned carbon nanotubes in the electrode according to the present invention may be variable. The latter is advantageously comprised between $10^6$ and $10^{13}$ nanotubes·cm$^{-2}$ of electrode. It is thereby possible to have a material having a dense carpet of vertically aligned carbon nanotubes, with of the order of $10^8$ to $10^{12}$ nanotubes·cm$^{-2}$ and notably of the order of $10^{11}$ to $10^{12}$ nanotubes·cm$^{-2}$.

The percentage by weight of the electrically conductive polymer matrix expressed compared to the total weight of the composite including the carbon nanotubes and this polymer matrix is comprised between 5 and 80%. As particular illustrative examples, this percentage may be of the order of 20% (i.e. 20%±5%) or of the order of 40% (i.e. 40%±5%).

In the electrode according to the invention, the carbon nanotubes advantageously have a length greater than 10 µm. In certain embodiments, this length may be greater than 20 µm, or even greater than 30 µm or than 50 µm.

Finally, the electrode according to the invention advantageously has a capacitance of at least 15 mF/cm$^2$.

The present invention also relates to the use of such an electrode or capable of being prepared by the method of the invention as positive/negative electrode of a device for storing and restoring electricity such as a supercapacitor or a battery, as electrode for photovoltaic device, in materials for the storage of $CO_2$ or as electrode for electrochemical sensors. Thus, the present invention relates to a device including an electrode according to the present invention or capable of being prepared by the method of the invention, said device being selected from the group consisting of a device for storing and restoring electricity such as a supercapacitor or a battery; a photovoltaic device; a material for the storage of $CO_2$ and an electrochemical sensor.

In a particular embodiment, a device for storing and restoring electricity according to the invention includes at least two single layer electrodes (positive and negative) or at least three electrodes of which two single layer electrodes (positive) and a double layer electrode (negative). As a reminder, a single layer electrode only comprises a single active surface, whereas a double layer electrode comprises two active surfaces respectively on its two opposite faces.

As illustrative and non-limiting examples, the device for storing and restoring electricity according to the invention may include:

1) an asymmetric assembly with an electrode according to the invention, for example, a support made of an aluminium based material with vertically aligned carbon nanotubes and coated with a matrix made of poly(3-methylthiophene) (Al/VACNT/P3MT) for the positive electrode(s) and a single layer or double layer activated carbon electrode;

Or 2) an asymmetric type 2 assembly with two electrodes according to the invention, the positive electrode being able to be of Al/VACNT/P3MT type and the negative electrode being able to correspond to a support made of an aluminium based material with vertically aligned carbon nanotubes and coated with a polypyrrole matrix (Al/VACNT/PPy);

Or 3) an asymmetric type 3 assembly with two electrodes according to the invention, a p and n dopable conjugated polymer being present on each of the VACNT electrodes, for example, Al/VACNT/Poly(fluorophenylthiophene) for the negative and positive electrodes;

Or 4) an asymmetric type 4 assembly with two different p and n dopable conjugated polymers on each of the VACNT electrodes, for example, Al/VACNT/Poly(fluorophenylthiophene) in negative and Al/VACNT/P3MT in positive.

The invention finally relates to a method for manufacturing a device for storing and restoring electricity such as a supercapacitor which includes at least two electrodes and an electrolyte separating the two electrodes, at least one of the electrodes being an electrode according to the invention or capable of being prepared by a method according to the invention, said manufacturing method including the different steps to assemble the two electrodes with in interface the electrolyte, the assembly being contained in an encapsulation package to form said device for storing and restoring electricity.

The assembly is carried out in a known manner and, for example, in the following manner, by considering a package constituting a container for arranging the electrodes and the electrolyte:

a') cutting the electrodes, at least one of which is an electrode according to the invention or capable of being prepared by a preparation method according to the invention, and cutting of separators, to the desired dimensions as a function of the type of assembly (symmetric or asymmetric) and the geometric shape and dimensions of the encapsulation package (battery of the cylindrical battery type, button type battery, or of the type known as pouch-cell, etc.);

b') making integral external electrical connection strips on each electrode, such as by ultrasonic welding;

c') assembling the electrodes to a separator;

d') making integral, such as by ultrasonic welding, the external electrical connection strips to the outer positive and negative terminals of the packaging;

e') putting the electrodes/separator assembly in place in the packaging, the order of steps (d') and (e') being able to be reversed;

f') addition and diffusion of the electrolyte in the electrodes/separator assembly; and g') sealing of the packaging.

According to the desired nature of the device for storing and restoring electricity, namely symmetric or asymmetric, the negative and positive electrodes will be cut to the desired dimensions. A symmetric system has in a known manner the negative electrode and the positive electrode which are of nearly identical, or even identical, nature and weight. Conversely, for an asymmetric system, the negative electrode has a nature or a weight different from those of the positive electrode.

The positive electrode of the device for storing and restoring electricity consists in an electrode according to the invention, i.e. a support made of an aluminium based material with carbon nanotubes and an electrically conductive polymer matrix. The negative electrode is, for example, made of activated carbon.

For the assembly, the separator may be a porous membrane based on cellulose, or based on polyethylene or polypropylene (Nafion®, Celgard®, etc.), or glass fibre. The separator and the electrolyte may sometimes only form a single assembly, in particular when the electrolytes are solid or in a gel.

Advantageously, the manufacturing method of the invention uses one or more porous membrane separator(s) with a liquid electrolyte or a gel electrolyte.

In order to obtain an optimal volumetric capacitance for the device for storing and restoring electricity, it is necessary to maximise the geometric contact surface between the negative and positive electrodes and the electrolyte, while minimising the volume of the package, the electrodes and the electrolyte. To this end, two types of assembly are favoured:
- the stack of electrodes which involve a welding common to electrodes of same type (negative or positive) in the case where the device such as a supercapacitor comprises several positive electrodes, or
- the winding of the positive and negative electrodes on one or two axe(s) forming either a cylindrical system, or a wound prismatic system.

Advantageously, the electrolyte of the device is selected from the same compounds as those selected for the electrolytic solution implemented for the deposition of the electrically conductive polymer matrix by electrochemical process during step (b) of the preparation method according to the invention. Thus, everything which has been described previously for the mixture of solvents used in the electrolytic solution also applies to the electrolyte of the device.

Alternatively, the electrolyte between the two electrodes may include
- either at least one protic and/or aprotic solvent and at least one salt dissolved in the solvent such as an imidazolium salt, a pyrrolidinium salt or an ammonium salt,
- or at least one pure protic and/or aprotic ionic liquid, Once the electrolyte added to and diffused in the electrodes/separator(s) assembly, the packaging is sealed either by thermoplastic bonding (for example, for the pouch-cell), or by mechanical sealing (metal and/or plastic covering, for notably button and cylindrical batteries) or metal welding for notably prismatic and cylindrical batteries of larger dimensions.

For certain types of packaging such as a metal bodied cylindrical batteries, it is necessary to insulate the metal packaging from external contact for reasons of electrical safety, via the addition of an electrically insulating coating.

Other characteristics and advantages of the present invention will further become clear to those skilled in the art on reading the examples given hereafter for illustrative and non-limiting purposes, with reference to the appended figures.

BRIEF DESCRIPTION OF THE DRAWINGS

FIGS. 4A to 4C show sectional views of the carpet of carbon nanotubes in three respective zones of this carpet: in the upper part of the carpet opposite the support (FIG. 4A), in the central part (FIG. 4B) and in the lower part (FIG. 4C), whereas

DETAILED DESCRIPTION OF PARTICULAR EMBODIMENTS

I. Preliminary Remarks.

The exemplary embodiments of electrodes according to the invention described hereafter highlight their performance as regards their capacitance, the aim being to propose high capacitance electrodes to be used in devices for storing and restoring electricity of the supercapacitor type.

Figure 1:
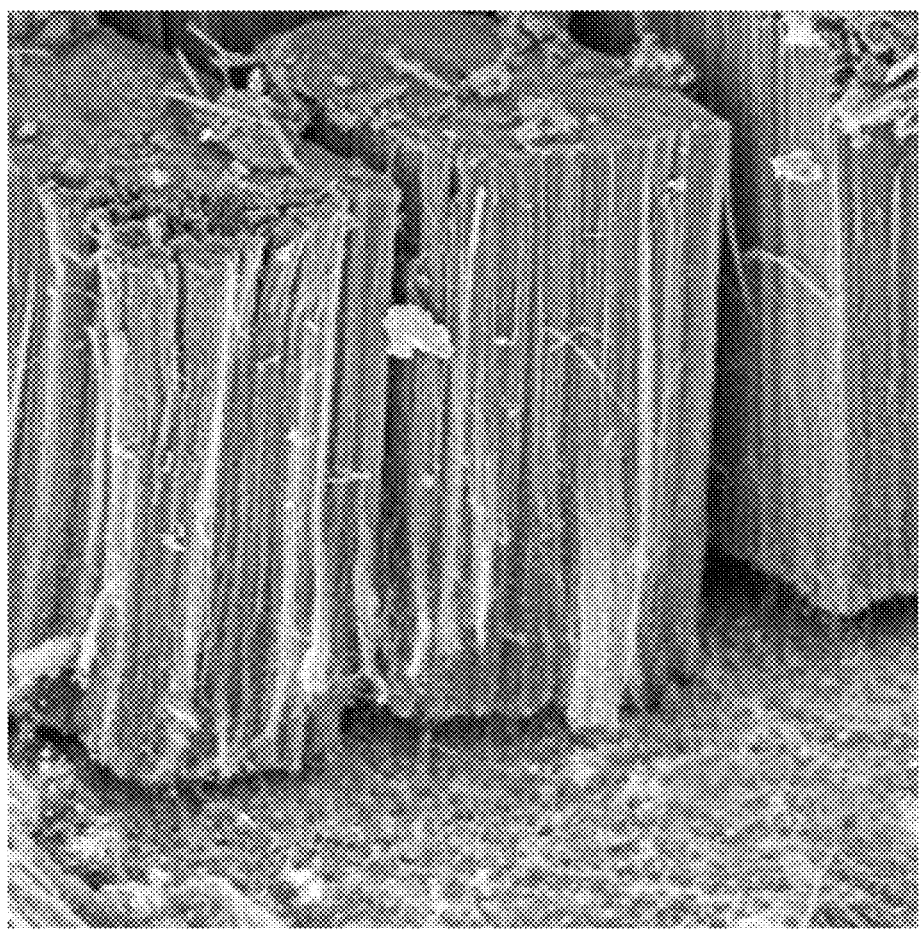
FIG. 1 shows the typical morphology of a carpet of CNTs aligned perpendicularly to the surface of the Al growth support used within the scope of the present invention.
Figure 2A:
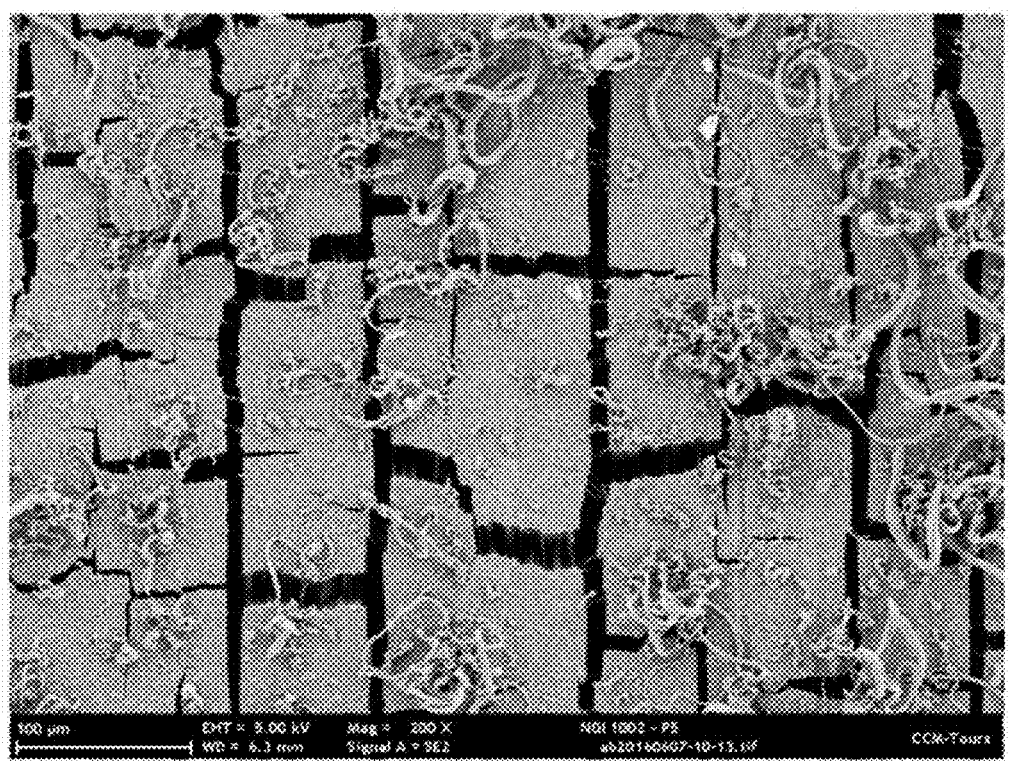
FIGS. 2A to 2D show scanning electron microscope images of the impact of the corrosion observed electrochemically on an electrode including an aluminium support provided with CNTs aligned perpendicularly to the surface of the support but not having an electroconductive polymer.
Figure 2B:
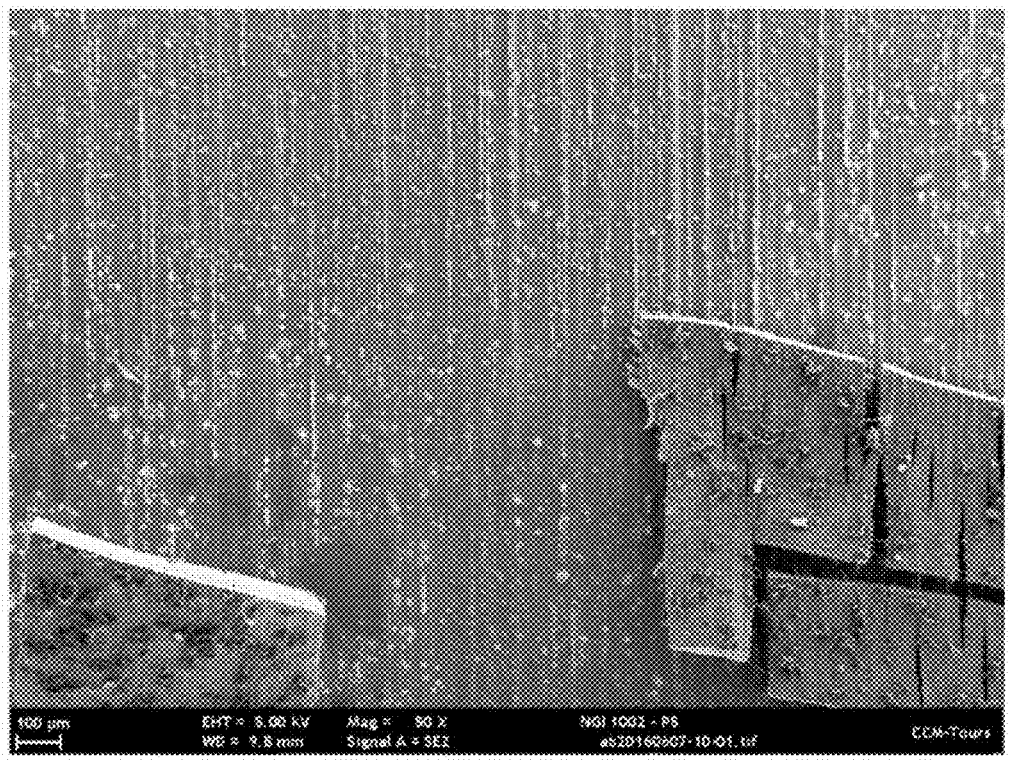
Figure 2C:
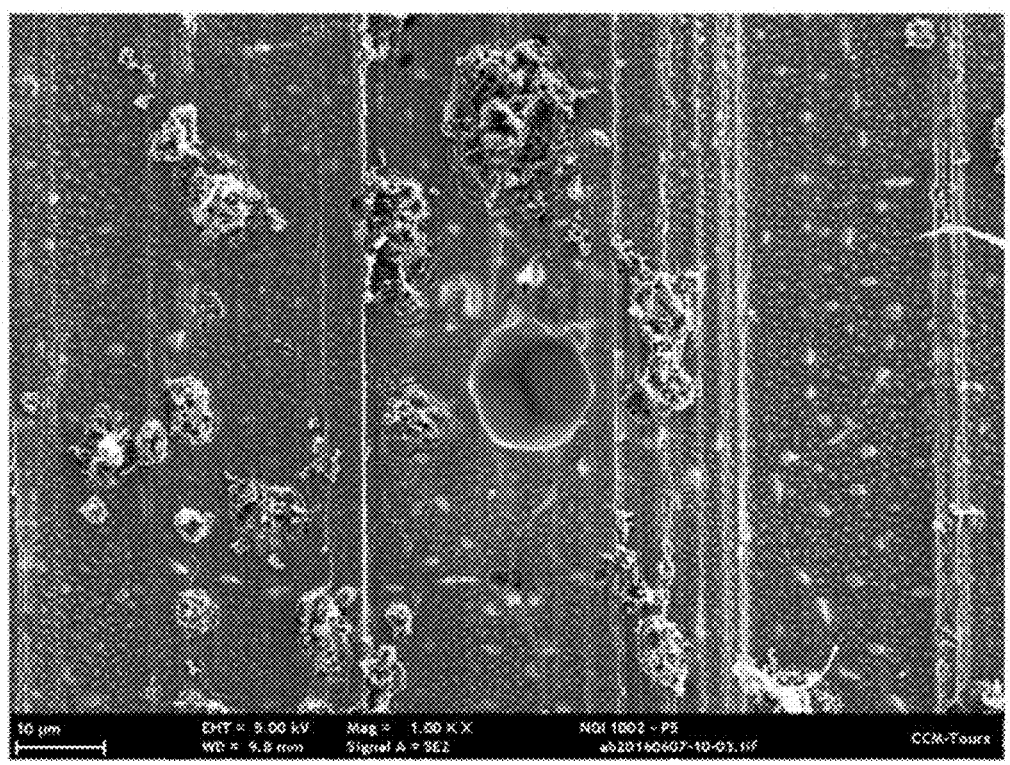
Figure 2D:
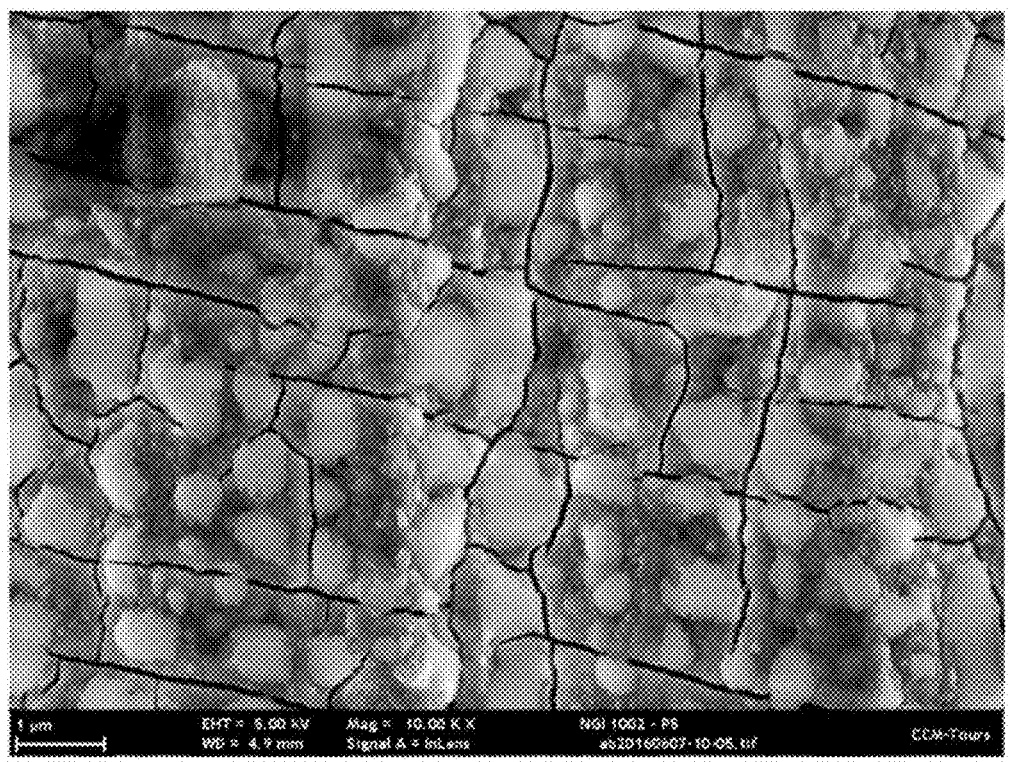

For all of the exemplary embodiments and comparative examples described hereafter, the synthesis of the CNTs on the aluminium support is carried out by CVD at 615° C. from acetylene as carbon source coupled to ferrocene as catalytic precursor and in the presence of hydrogen and argon. The ferrocene is conveyed into the reactor using a toluene solution (10% by weight of ferrocene dissolved in toluene) in aerosol form in a flow rate range ranging from 0.7 to 7 mL/h. The typical morphology of the carpet of CNTs aligned perpendicularly to the surface of the Al growth support thereby obtained is represented in FIG. 1.

The control of the different lengths of the CNTs aligned on the aluminium support described through the exemplary embodiments described hereafter is established by adjustment of synthesis parameters such as the duration of injection of the precursors or the ratio of the gases constituting the reaction atmosphere ($Ar/H_2/C_2H_2$). These parameters will not be described for each of the examples and those skilled in the art can find any complementary information necessary to carry out and to control the synthesis of CNTs aligned on aluminium support in the international application WO 2015/071408 [1].

II. Effect of the Electrolyte on a Supercapacitor with Aluminium Collector.

In order to study the effect of the electrolyte in which the electrode is cycled, an aluminium support electrode provided with carbon nanotubes and not comprising any electroconductive polymer was used.

This electrode includes, more specifically, an aluminium support having an active surface of 1.13 cm$^2$ and vertically aligned carbon nanotubes of 65 µm length and of high nanotube surface density, of the order of $10^{11}$ to $10^{12}$ CNT/cm$^2$. This electrode was prepared as described in point I above.

The electrolyte in which this electrode was cycled is a mixture known to be very corrosive for aluminium electrode substrates [12] i.e. 1 mol/L lithium bis(trifluoromethylsulphonyl)amide in acetonitrile.

FIG. 2 shows scanning electron microscope images of the impact of the electrochemical corrosion observed on the electrode tested after 2000 cycles. The corrosion on the electrode causes cracking of the CNT carpet (FIG. 2A), disbondments of the carpet (FIG. 2B) and corrosion pits (FIG. 2C) and cracking of the surface of the support (FIG. 2D).

III. Preparation of an Electrode According to the Invention and Characterisation.

III.1. Operating Procedure.

An aluminium support having an active surface of 1.13 cm$^2$ and including vertically aligned carbon nanotubes of 25 μm length and of high nanotube surface density, of the order of $10^{11}$ to $10^{12}$ CNT/cm$^2$ was prepared as described in point 1 above.

An electroconductive polymer of the poly(3-methylthiophene) (or P3MT) type is deposited on this aluminium support provided with CNTs by electrochemical process.

The electrochemical device used to carry out this deposition by electrochemical process includes, for example, in a known manner, a stainless steel base on which the sample is deposited surmounted by a cylindrical body made of Teflon.

The electrochemistry technique used is with three electrodes. The working electrode is constituted of the sample with the carbon nanotubes whereas the counter-electrode is a composite paste of carbon black and activated carbon. The assembly is imprisoned in a stainless steel grid. The reference electrode is a silver wire.

The electrolyte contained in the electrochemical device is a 50:50 by volume mixture of acetonitrile and EMITFSI, to which is added the 3-methylthiophene monomer at a concentration of 0.4 M.

The electrochemical technique chosen is cyclic voltammetry. The voltage is imposed between −0.5 V and 1.5 V at a scanning rate of 20 mV/s for 50 cycles.

In these conditions, an electrode is obtained in which the proportion of electroconductive polymer compared to the composite that is to say the carbon nanotubes and the electroconductive polymer is less than 50% by weight.

III.2. Study of the Capacitance of the Electrode Prepared at Point III.1.

In order to characterise the capacitance per surface unit of the electrode according to the invention and to compare it with that of the same electrode (same aluminium support provided with carbon nanotubes and same specific surface) but without electroconductive polymer, the cyclic voltammetry technique was used by imposing a voltage between −0.5 to 1.5 V at a scanning rate of 10 mV/s for 5 cycles.

Figure 3:
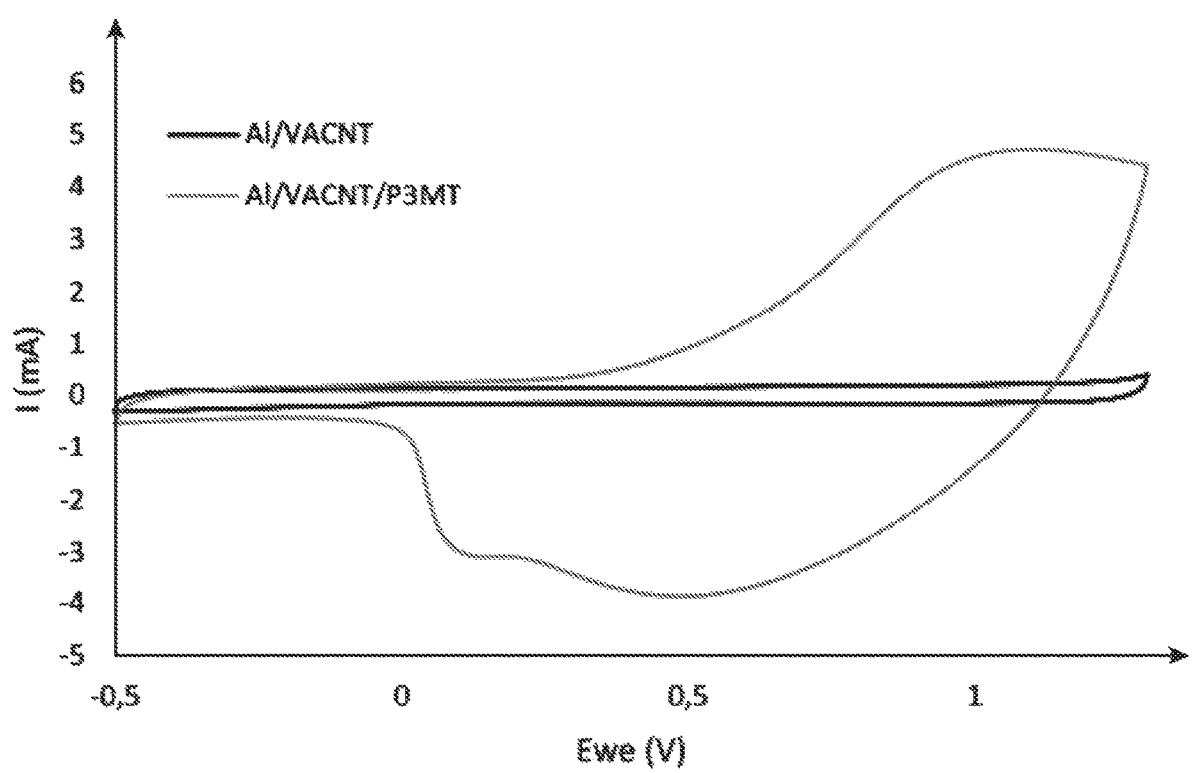
FIG. 3 shows the cyclic voltamperometry curves obtained for the aluminium support provided with carbon nanotubes aligned before the deposition of the electroconductive polymer (Al/VACNT) or after this deposition (Al/VACNT/P3MT).

The characterisation of the capacitance provides a capacitance of 204 mF/cm$^2$ for the electrode according to the invention (aluminium support provided with carbon nanotubes functionalised by P3MT), whereas the capacitance of the comparative electrode without electroconductive polymer is 29 mF/cm$^2$ (FIG. 3). The capacitance is increased sevenfold for the electrode according to the invention having an electroconductive polymer associated with the vertically aligned carbon nanotubes on an aluminium support.

The electroconductive polymer makes it possible to provide a much greater capacitance than in the absence of polymer.

IV. Alternative of Preparation of an Electrode According to the Invention and Characterisation.

IV.1. Operating Procedure.

Compared to the operating procedure of point III.1, this illustrative example implements an aluminium support provided with carbon nanotubes having a greater height and another electrolyte to functionalise the carbon nanotubes with P3MT.

To this end, an aluminium support having an active surface of 1.13 cm$^2$ and including vertically aligned carbon nanotubes of 70 μm length and of high nanotube surface density, of the order of $10^{11}$ to $10^{12}$ CNT/cm$^2$ was prepared as described in point I above.

The electrochemical device and technique implemented are identical to those used in the operating procedure of point III.1.

Conversely, the electrolyte contained in the electrochemical device is a 50:50 by volume mixture of acetonitrile and EMI-BF4 (1-ethyl-3-methylimidazolium tetrafluoroborate), to which has been added the 3-methylthiophene monomer at a concentration of 0.2 mol/L. In addition, during cyclic voltammetry, the voltage is imposed between −0.2 and 1.4 V at a scanning rate of 5 mV/s for 100 cycles.

In these conditions, an electrode is obtained in which the proportion of electroconductive polymer compared to the composite, that is to say the carbon nanotubes and the electroconductive polymer, is at least 85% by weight.

IV.2. Study of the Capacitance of the Electrode Prepared at Point IV.1.

In order to characterise the capacitance per surface unit of the electrode according to the invention and to compare it with that of the same electrode (same aluminium support provided with carbon nanotubes and same specific surface) but without electroconductive polymer, the cyclic voltammetry technique was used while imposing a voltage between −0.2 to 1.4 V at a scanning rate of 10 mV/s for 5 cycles.

The characterisation of the capacitance provides a capacitance of 1077 mF/cm$^2$ for the electrode according to the invention (aluminium support provided with carbon nanotubes functionalised by P3MT), whereas the capacitance of the comparative electrode without electroconductive polymer is 27 mF/cm$^2$. The capacitance is multiplied by 40 for the electrode according to the invention having an electroconductive polymer associated with the vertically aligned carbon nanotubes on an aluminium support.

In this preparation alternative, the electroconductive polymer also makes it possible to provide a much greater capacitance than in the absence of polymer.

IV.3. Characterisation of the Deposition of P3MT According to the Protocol of Point IV.1.

A scanning electron microscope (SEM) analysis associated with analysis by energy dispersive X-rays (EDX) was carried out on the electrode prepared according to the protocol of point IV.1.

Figure 4A:
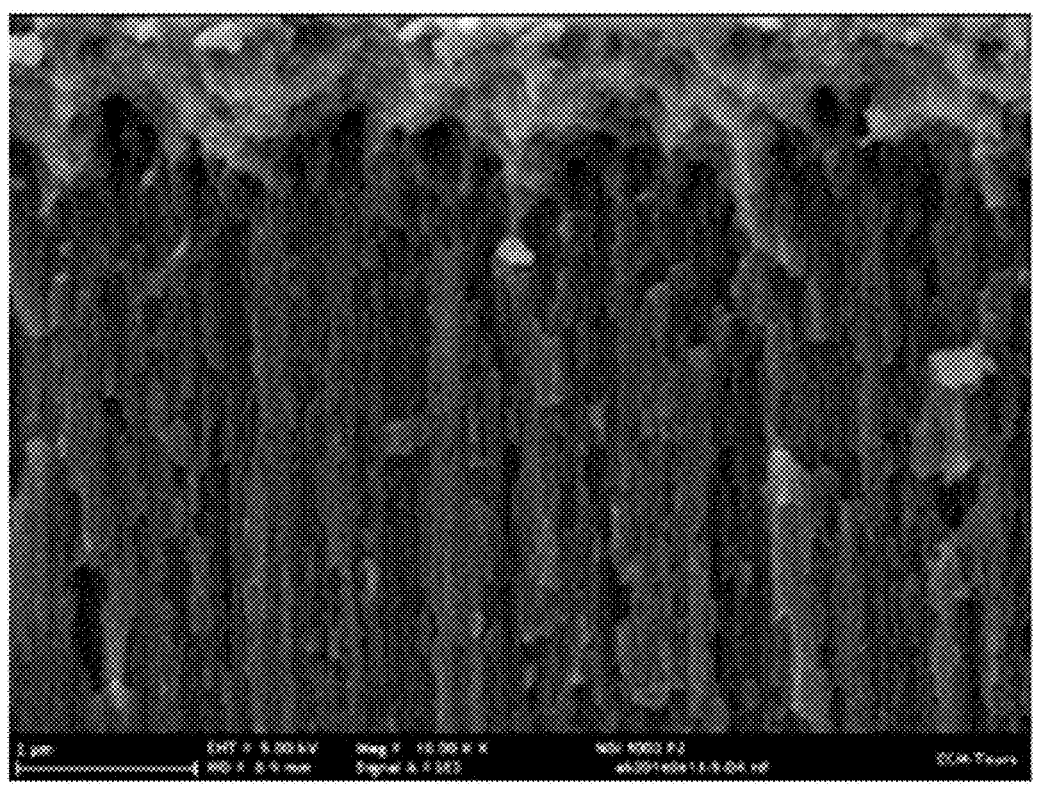
Figure 4D:
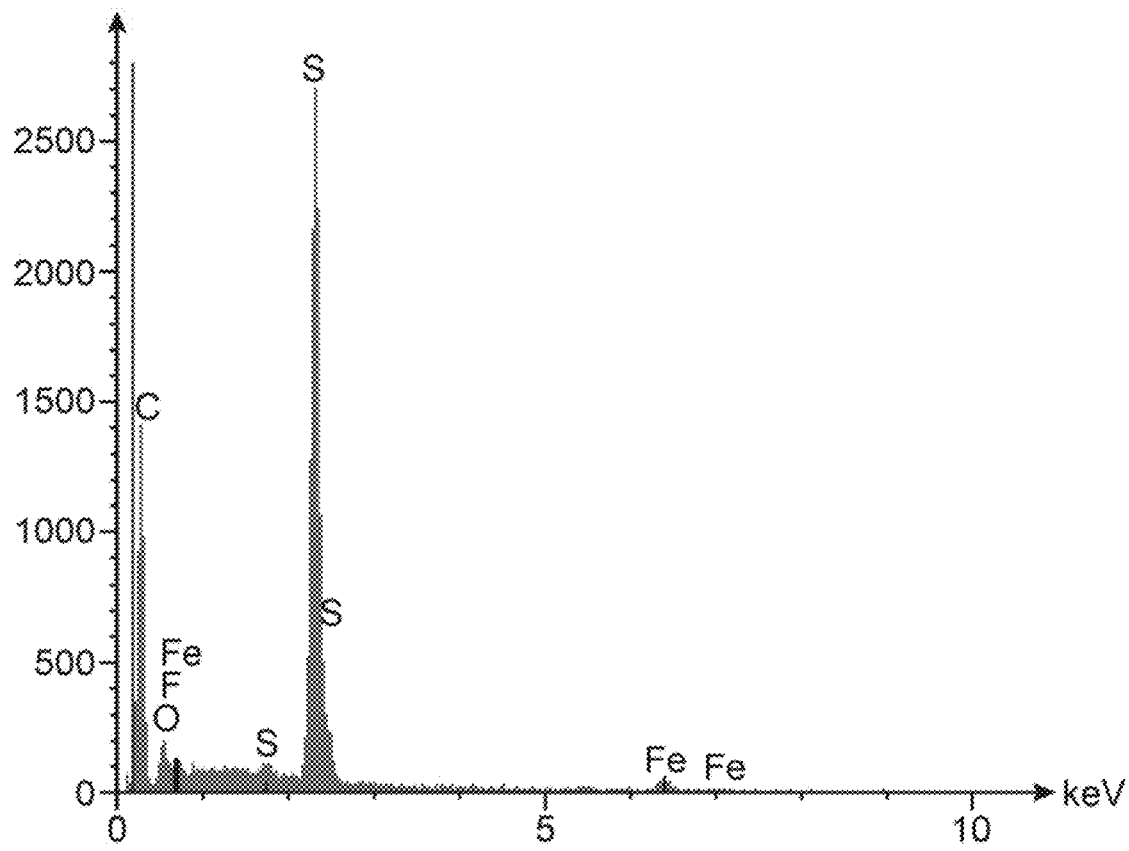
FIG. 4D to 4F show the corresponding EDX mapping in the upper part of the carpet opposite the support (FIG. 4D), in the central part (FIG. 4E) and in the lower part (FIG. 4F).
Figure 4B:
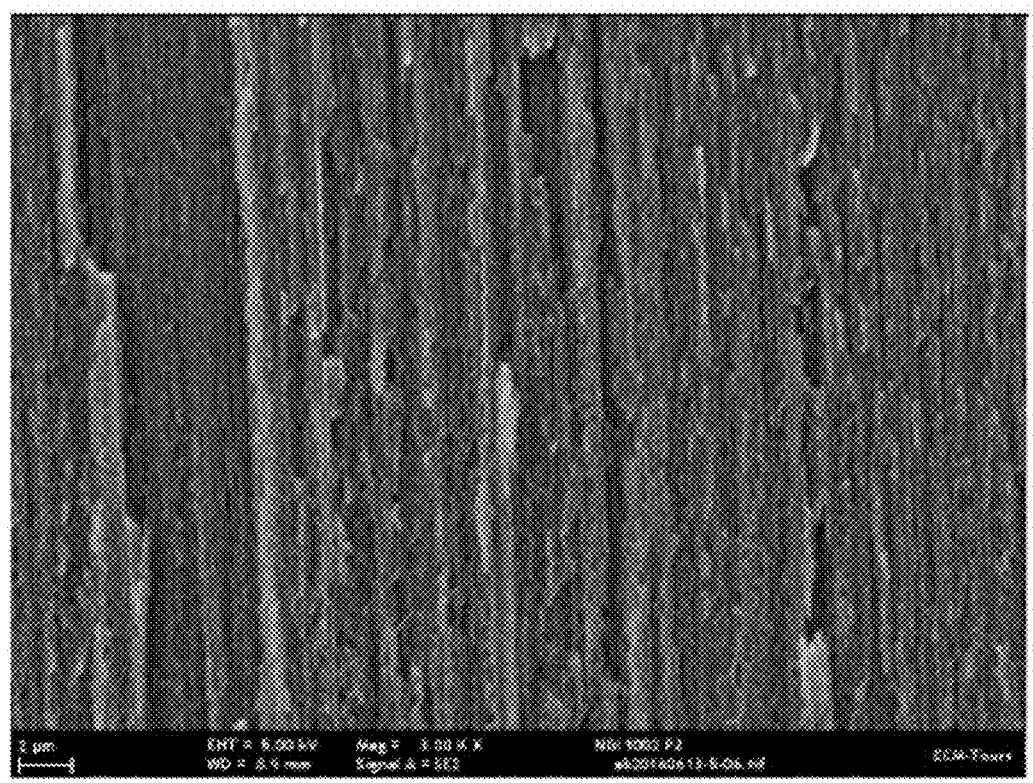
Figure 4E:
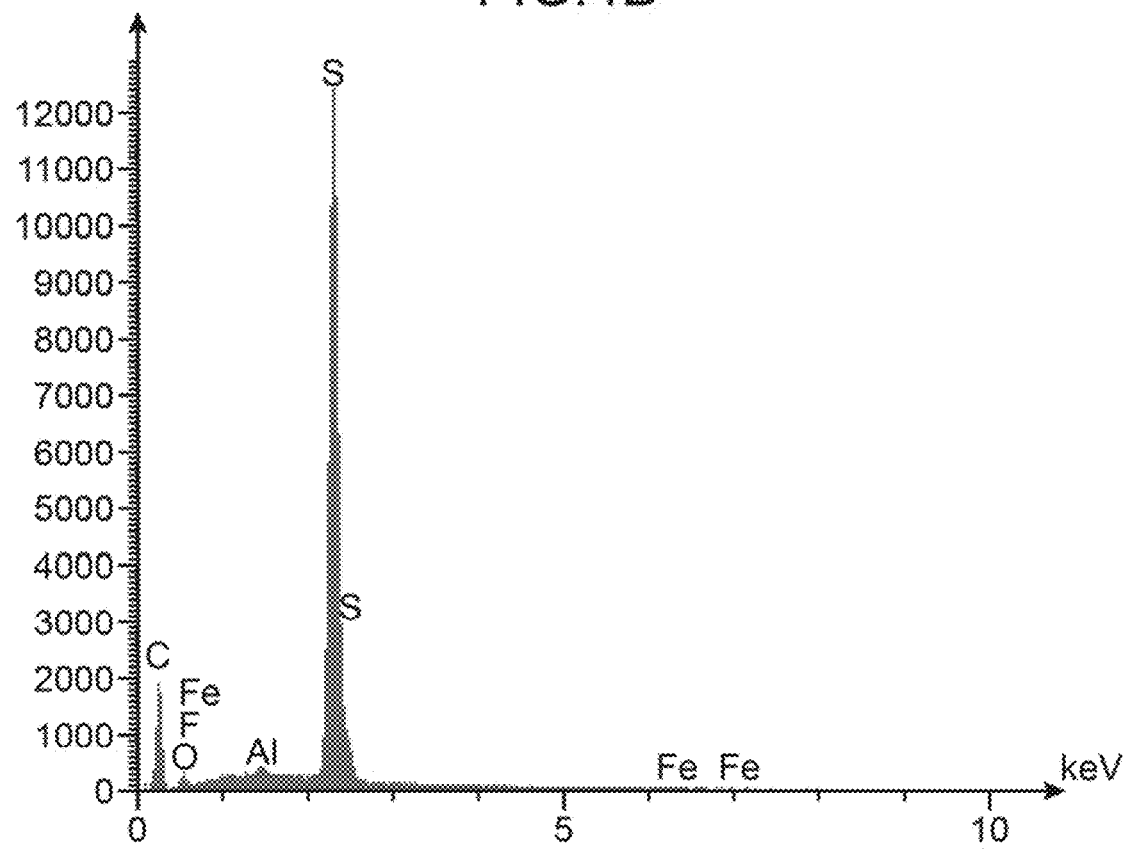
Figure 4C:
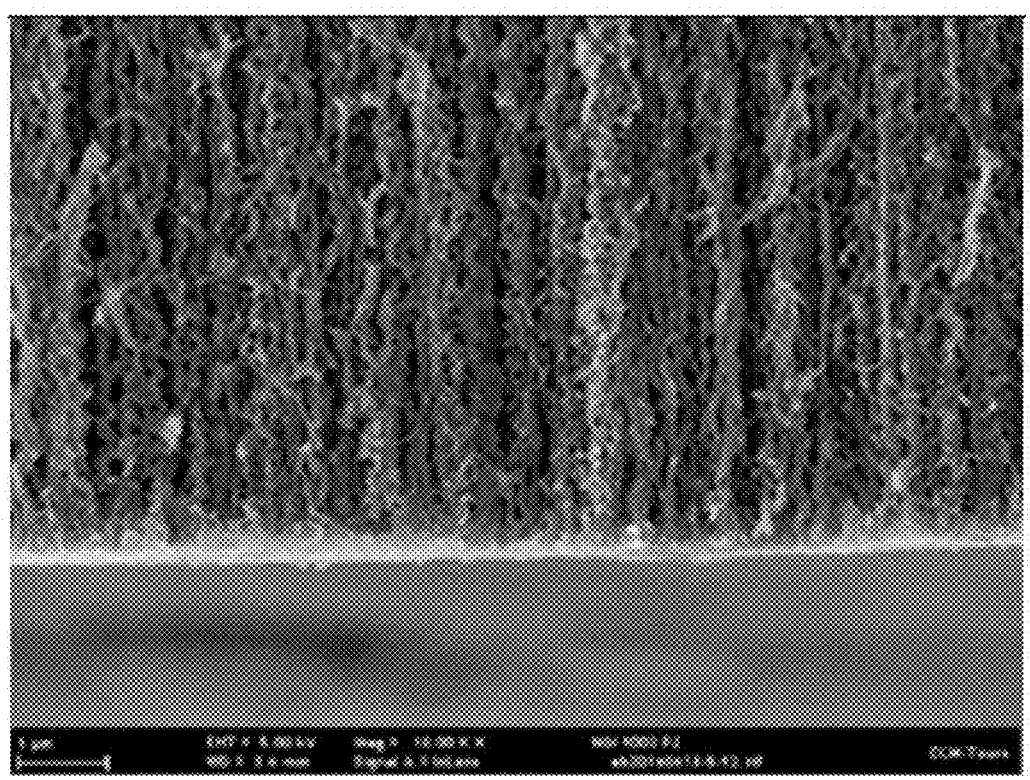
Figure 4F:
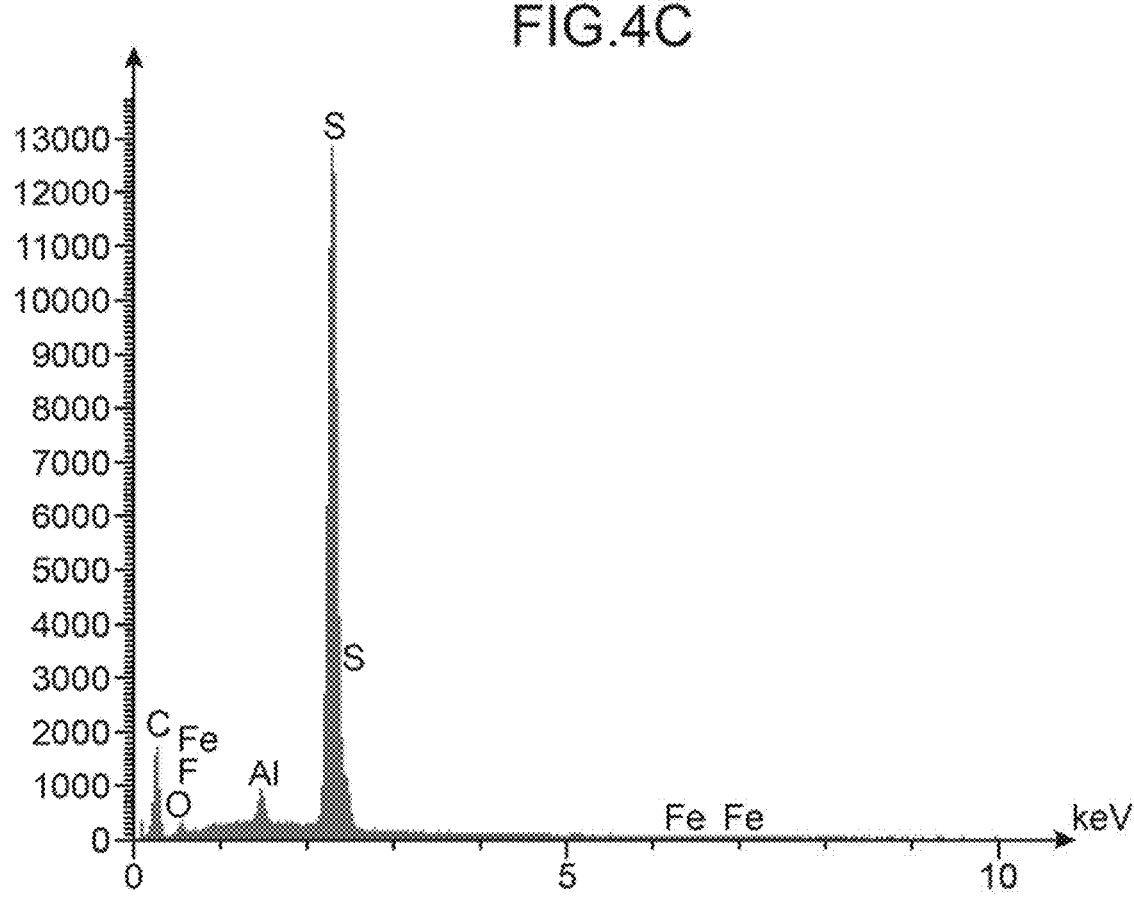

The EDX mappings in the upper part of the carpet of carbon nanotubes opposite the support (FIG. 4D), in the central part of the carpet (FIG. 4E) and in the lower part of the carpet of nanotubes (FIG. 4F) all have, as main peak, that of sulphur attesting to the presence of P3MT in all the zones of the carpet of nanotubes tested and thus the homogeneity of the deposition of P3MT over the entire height of the carbon nanotubes. The fluorine peak is, for its part, virtually inexistent making it possible to affirm that there remains, in the composite, virtually no tetrafluoroborate ions initially present in the electrolyte used to deposit the P3MT.

Thus, the method of the invention makes it possible to manufacture electrodes of which the density of vertically aligned carbon nanotubes, the length of these vertically aligned carbon nanotubes and the proportion of electroconductive polymer will be adapted as a function of the capacitance desired for the electrode and, in the end, the capacitance desired for the supercapacitor including at least one electrode according to the invention.

V. Supercapacitor Including an Electrode According to the Invention.

V.1. Preparation of a Supercapacitor S1 According to the Invention.

The supercapacitor, designated supercapacitor or battery S1, is in the form of a button battery of the type CR2032, with asymmetric electrodes, and comprises:
- an electrode, known as electrode NTC1, of vertically aligned carbon nanotubes on an aluminium support associated with an electroconductive polymer obtained from 3-methylthiophene;
- an activated carbon electrode;
- a separator between the two polypropylene electrodes of 25 µm such as the product sold under the name Celgard® 2500;
- an electrolyte separating the two electrodes based on acetonitrile and EMITFSI.

The electrode NTC1 has a surface of 1.13 cm², vertically aligned carbon nanotubes of which the height is around 84 µm, a high nanotube surface density (of the order of $10^{11}$ to $10^{12}$ CNT/cm²) with a deposition surface of P3MT over the whole of the active surface of 1.13 cm².

As regards the preparation of the electrode NTC1, the electrolyte of the electrochemical deposition device of P3MT is a 75:25 by volume mixture of acetonitrile and EMITFSI to which is added the 3-methylthiophene monomer at a concentration of 0.4 M. The electrochemical technique selected is chronoamperometry. The voltage is imposed at 1.55 V per 250 ms pulse and with, between each pulse, an opening of the circuit of 1.5 s until a polymer/composite mass ratio of 20% is obtained.

The electrodes of the battery and the separator were dried in a glass oven, of Bucchi® type, under vacuum between 50 and 80° C.

The electrolyte of the battery S1 is a 40:60 by weight mixture of acetonitrile and EMITFSI with 10% by weight of $LiPF_6$ (lithium hexafluorophosphate) salt as anticorrosion additive. It should be noted that this electrolyte is comparable to the highly corrosive electrolyte used at point II above: same anion, same solvent and similar transport properties.

The electrolyte was arranged in the package containing the electrodes and the separator under inert argon atmosphere.

V.2. Preparation of a Supercapacitor S2 According to the Invention.

The supercapacitor, designated supercapacitor or battery S2, is distinguished from the supercapacitor S1 at the level of the characteristics relative to the carbon nanotubes, the weight ratio of P3MT and the electrolyte of the battery which does not include any anticorrosion additive.

The battery S2 comprises an electrode, designated battery NTC2, which has a surface of 1.13 cm², vertically aligned carbon nanotubes of which the height is around 80 µm, a high nanotube surface density (of the order of $10^{11}$ to $10^{12}$ CNT/cm²) with a deposition surface of P3MT over the whole of the active surface of 1.13 cm² and this is so in a polymer/composite weight ratio of 40%.

The two electrodes NTC1 and NTC2 are extremely similar with regard to the length of the carbon nanotubes and the density (2.25 and 3.48 mg/cm²). On the other hand, the amount of electroconductive polymer is two times greater for the electrode NTC2.

The electrolyte of the battery S2 is the same as that of the battery S1 i.e. a 40:60 by weight mixture of acetonitrile and EMITFSI but, on the other hand, without anticorrosion additive.

V.3. Preparation of a Comparative Supercapacitor Scomp.

The comparative supercapacitor, designated supercapacitor or battery Scomp, corresponds to a button battery such as the batteries S1 and S2, apart from the aluminium support electrodes provided with carbon nanotubes, i.e. the positive and negative electrodes NTCcomp, do not comprise any electroconductive polymer.

The electrodes NTCcomp have a surface of 1.13 cm², vertically aligned carbon nanotubes of which the height is around 65 µm and a high nanotube surface density (of the order of $10^{11}$ to $10^{12}$ CNT/cm²).

The two electrodes NTCcomp are similar with regard to the length of the carbon nanotubes and the weight per unit area of the electrodes NTC1 and NTC2.

The electrolyte of the battery Scomp is the same as that of the battery S2 i.e. a 40:60 by weight mixture of acetonitrile and EMITFSI without anticorrosive additive.

V.4. Charge/Discharge Capacitance and Coulombic Efficiency of the Supercapacitors S1, S2 and Scomp.

Tables I, II and III hereafter resume the charge and discharge capacitances and the coulombic efficiency at the $1^{st}$ cycle and after 1500 cycles, as well as the capacitance retention rate of the battery S1, the battery S2 and the battery Scomp respectively. The capacitance retention rate is the normalised percentage of capacitance after cycling. "Cycle" is taken to mean the fact of charging and discharging totally the system.

TABLE I (Battery S1)

| Cycle | 1st | After 1500 cycles | Retention % |
|---|---|---|---|
| C(system-charge)/mF/cm² | 133.9 | 111.9 | 83.5 |
| C(system-discharge) mF/cm² | 132.9 | 110.0 | 82.8 |
| Coulombic efficiency/% | 99.27 | 98.34 | — |

TABLE II (Battery S2)

| Cycle | $1^{st}$ cycle | After 1500 cycles | Retention % |
|---|---|---|---|
| C(system-charge)/mF/cm² | 170.3 | 128.1 | 75.2 |
| C(system-discharge) mF/cm² | 168.0 | 126.0 | 75.0 |
| Coulombic efficiency/% | 98.68 | 98.59 | — |

TABLE III (Battery Scomp)

| Cycle | $1^{st}$ cycle | After 1500 cycles | Retention % |
|---|---|---|---|
| C(system-charge)/mF/cm² | 29.8 | 24.4 | 81.9 |
| C(system-discharge) mF/cm² | 26.5 | 24.0 | 90.5 |
| Coulombic efficiency/% | 89.11 | 98.47 | — |

The batteries S1 and S2 thus provide a cyclability over more than 1500 cycles without dysfunction.

The performance of the battery S2 with regard to its charge and discharge cycles is comparable to that of the battery S1. Moreover, the presence of an anticorrosion additive is not strictly necessary despite the use of a potentially corrosive electrolyte for the aluminium collector.

The performance of the battery Scomp with regard to its charge and discharge cycles and in the absence of an anticorrosion additive in the electrolyte implemented is well below that of the batteries S1 and S2.

Consequently, the electrode of the invention based on an aluminium support makes it possible to provide a lightened supercapacitor, while providing good performances with regard to the capacitance without risk of corrosion of the electrode thanks to the presence of vertically aligned carbon nanotubes associated with the electrically conductive polymer.

REFERENCES

[1] International application WO 2015/071408 in the name of the CEA published on the 21 May 2015;
[2] Yoshikawa et al, 2008, "An efficient fabrication of vertically aligned carbon nanotubes on flexible aluminum foils by catalyst-supported chemical vapor deposition", Nanotechnology, vol. 19, 245607;
[3] Dorfler et al, 2013, "High power supercap electrodes based on vertically aligned carbon nanotubes on aluminium", J. of Power Sources, vol. 227, pages 218-228;
[4] Arcila-Velez et al, 2014, "Roll-to-roll synthesis of vertically aligned carbon nanotube electrodes for electrical double layer capacitors", Nano Energy, vol. 8, pages 9-16;
[5] Liatard et al, 2015, "Vertically aligned carbon nanotubes on aluminum as a light-weight positive electrode for lithium-polysulphide batteries", Chemical Communications, vol. 51, pages 7749-7752;
[6] Huang et al, 2012, "Exploring aligned-carbon-nanotubes@polyaniline arrays on household Al as supercapacitors", ChemSusChem, vol. 5, pages 888-895;
[7] International application WO 2012/004317 in the names of the CEA, Université François Rabelais & Université de Cergy Pontoise published on the 12 Jan. 2012;
[8] Lagoutte et al, 2014, "Poly(3-methylthiophene)/vertically aligned multi-walled carbon nanotubes: electrochemical synthesis, characterizations and electrochemical storage properties in ionic liquids", Electrochimica Acta, vol. 130, pages 754-765;
[9] Warren et al, 2015, "Electrochemically synthesized and vertically aligned carbon nanotube-polypyrrole nanolayers for high energy storage devices", Sensors and Actuators A, vol. 231, pages 65-73;
[10] Liu et al, 2008, "Electropolymerization of high stable poly(3,4-ethylenedioxythiophene) in ionic liquid and its potential applications in electrochemical capacitor", Journal of Power Sources, vol. 179, pages 858-862;
[11] Lagoutte et al, 2013, "Electrochemical and optical properties of poly(3,4-dimethylthiophene) and its copolymers with 3-methylthiophenein ionic liquids media", Electrochimica Acta, vol. 106, pages 13-22;
[12] Kühnel & Balducci, 2014, "Comparison of the anodic behavior of aluminium current collectors in imide based ionic liquids and consequences on the stability of high voltage supercapacitors", J. Power Sources, vol. 249, pages 163-171;
[13] International application WO 2008/016990 in the name of Ada Technologies published on the 7 Feb. 2008.

What is claimed is:

1. A method for the preparation of an electrode including a support made of an aluminium based material, vertically aligned carbon nanotubes and an electrically conductive polymer matrix, said method including the following successive steps:
   a) synthesizing, on a support made of an aluminium based material, a carpet of vertically aligned carbon nanotubes according to the CVD (Chemical Vapour Deposition) technique at a temperature less than or equal to 650° C.;
   b) electrochemically depositing said electrically conductive polymer matrix on said vertically aligned carbon nanotubes from an electrolytic solution including at least one precursor monomer of said electrically conductive polymer matrix, at least one ionic liquid and at least one protic or aprotic solvent;
   wherein said at least one ionic liquid comprises an anion, wherein the anion is $(CF_3SO_2)_2N^-$; and
   wherein during said b) the electrolytic solution contacts the vertically aligned carbon nanotubes and the support.

2. The method according to claim 1, wherein the synthesizing during said a) is carried out at a temperature comprised between 500° C. and 620° C.

3. The method according to claim 1, wherein, following said (a) and prior to said (b), the vertically aligned carbon nanotubes are subjected to an oxidising treatment.

4. The method according to claim 1, wherein said electrically conductive polymer matrix is constituted of at least one polymer or copolymer selected from the group consisting of polypyrroles, polycarbazoles, polyanilines and polythiophenes.

5. The method according to claim 1, wherein said ionic liquid further comprises at least one protic or aprotic cation, substituted or not, selected from the family of pyridinium, pyridazinium, pyrimidinium, pyrazinium, imidazolium, pyrazolium, thiazolium, oxazolium, triazolium, ammonium, pyrrolidinium, pyrrolinium, pyrrolium, piperidinium.

6. The method according to claim 1, wherein said ionic liquid is selected from the group consisting of a dialkylpyrrolidinium bis(trifluoromethylsulphonyl)imide ([DAPyr] [TFSI]), 1 ethyl-3-methylimidazolium bis(trifluoromethyl sulphonyl)imide ([EMI] [TFSI]), 1-butyl-3-methylimidazolium bis(trifluoromethylsulphonyl)imide ([BMI][TFSI]), and butyltrimethylammonium bis(trifluoromethylsulphonyl)imide ([BtMA][TFSI]).

7. The method according to claim 1, wherein said aprotic solvent is acetonitrile.

8. The method according to claim 1, wherein a viscosity of said electrolytic solution is comprised between 0.37 mPa·s and 200 mPa·s.

9. The method according to claim 1, wherein the electrochemically depositing of said b) takes place by a cyclic method and/or a galvanostatic method, pulsed or continuous, and/or a potentiostatic method, pulsed or continuous.

10. The method according to claim 1, wherein said electrically conductive polymer matrix comprises up to 99 wt % of a total weight of the vertically aligned carbon nanotubes coated with said electrically conductive polymer matrix.

11. The method according to claim 1, wherein, following said (b), the method has a rinsing step and optionally a drying step.

12. An electrode prepared by a method defined in claim 1.

13. The electrode according to claim 12, wherein a density of said vertically aligned carbon nanotubes is comprised between $10^6$ and $10^{13}$ nanotubes per square centimeter of electrode.

14. The use of an electrode according to claim 12 as a positive and/or negative electrode of a device for storing and restoring electricity, as an electrode for a photovoltaic device, in materials for storing $CO_2$ or as an electrode for electrochemical sensors.

15. A device for storing and restoring electricity including:
   (1) an asymmetric assembly with an electrode according to claim 12 as a positive electrode and a single layer or double layer activated carbon electrode;
   or
   (2) an asymmetric type 2 assembly with two electrodes according to claim 12;
   or
   (3) an asymmetric type 3 assembly with two electrodes according to claim 12, a p and n dopable conjugated polymer being present on each of the electrodes;
   or
   (4) an asymmetric type 4 assembly with two different p and n dopable conjugated polymers on each of two electrodes according to claim 12.

16. A method for manufacturing a device for storing and restoring electricity which includes at least two electrodes and an electrolyte separating the two electrodes, at least one of the electrodes being an electrode according to claim 12, wherein the method includes assembling the two electrodes and the electrolyte to form an assembly, the electrolyte being an interface between the two electrodes, the assembly being contained in an encapsulation package to form said device for storing and restoring electricity.

17. The method according to claim 8, wherein the viscosity of said electrolytic solution is comprised between 1.0 mPa·s and 36 mPa·s at 0° C. and 1 bar.

18. The electrode according to claim 13, wherein the density of said vertically aligned carbon nanotubes is comprised between $10^8$ and $10^{12}$ nanotubes per square centimeter of electrode.

19. The electrode according to claim 18, wherein the density of said vertically aligned carbon nanotubes is comprised between $10^{11}$ and $10^{12}$ nanotubes per square centimeter of electrode.

20. The use of an electrode according to claim 14, wherein the device for storing and restoring electricity is a supercapacitor or a battery.

* * * * *